(12) United States Patent
Glodjo et al.

(10) Patent No.: US 7,130,789 B2
(45) Date of Patent: Oct. 31, 2006

(54) GLOBAL ELECTRONIC TRADING SYSTEM

(75) Inventors: Arman Glodjo, Hamilton (BM); Nathan D. Bronson, Durham, NC (US); Scott E. Harrington, Carrboro, NC (US)

(73) Assignee: Valaquenta Intellectual Properties Limited, Hamilton (BM)

( * ) Notice: Subject to any disclaimer, the term of this patent is extended or adjusted under 35 U.S.C. 154(b) by 81 days.

(21) Appl. No.: 10/741,735

(22) Filed: Dec. 18, 2003

(65) Prior Publication Data

US 2004/0133506 A1    Jul. 8, 2004

Related U.S. Application Data

(62) Division of application No. 10/005,609, filed on Nov. 7, 2001.

(60) Provisional application No. 60/249,796, filed on Nov. 17, 2000, provisional application No. 60/288,310, filed on May 2, 2001.

(51) Int. Cl.
*G06F 17/60* (2006.01)
(52) U.S. Cl. .......................... 703/37; 705/35
(58) Field of Classification Search ............. 705/35, 705/37
See application file for complete search history.

(56) References Cited

U.S. PATENT DOCUMENTS

| | | | |
|---|---|---|---|
| 4,677,552 A | 6/1987 | Sibley, Jr. | |
| 4,977,582 A * | 12/1990 | Nichols et al. | ............. 375/371 |
| 5,262,942 A | 11/1993 | Earle | |
| 5,375,055 A | 12/1994 | Togher | |
| 5,732,400 A | 3/1998 | Mandler et al. | |
| 5,924,082 A | 7/1999 | Silverman | |
| 5,924,083 A | 7/1999 | Silverman | |
| 5,930,767 A | 7/1999 | Reber | |
| 5,950,176 A | 9/1999 | Keiser | |
| 6,029,146 A | 2/2000 | Hawkins | |
| 6,317,727 B1 | 11/2001 | May | |
| 6,343,278 B1 | 1/2002 | Jain et al. | |
| 6,347,307 B1 | 2/2002 | Sandhu et al. | |
| 6,519,574 B1 | 2/2003 | Wilton et al. | |
| 6,646,989 B1 * | 11/2003 | Khotimsky et al. | ......... 370/238 |
| 6,651,099 B1 * | 11/2003 | Dietz et al. | .................. 709/224 |
| 2002/0016762 A1 | 2/2002 | Feilbogen et al. | |
| 2002/0023045 A1 | 2/2002 | Feilbogen et al. | |
| 2002/0087454 A1 | 7/2002 | Calo et al. | |

(Continued)

FOREIGN PATENT DOCUMENTS

EP       0 407 026 B1    11/1995

(Continued)

OTHER PUBLICATIONS

Ahuja, R.K., Magnanti, T.L., and Orlin, J.B., *Network Flows: Theory, Algorithms, and Applications*, chs. 7 & 9 (Prentice-Hall, Inc. 1993), U.S.A.

(Continued)

*Primary Examiner*—Alain L. Bashore
(74) *Attorney, Agent, or Firm*—Sonnenschein Nath & Rosenthal LLP

(57) ABSTRACT

Methods, systems, and computer readable media for facilitating trading two items (L,Q) from the group of items comprising commodities and financial instruments. At least two agents (2) want to trade the items (L,Q). There is a trading channel (3) between the two agents (2) allowing for the execution of trades. There are flow (trading) limits on the items being traded. A central computer (1) is coupled to the two agents (2). Said computer (1) is adapted to convey to each agent (2) current tradable bid and offered prices and sizes subject to the agent's (2) trading limits.

24 Claims, 31 Drawing Sheets

U.S. PATENT DOCUMENTS

| | | |
|---|---|---|
| 2002/0101967 A1 | 8/2002 | Eng et al. |
| 2002/0107781 A1 | 8/2002 | Neyman et al. |
| 2003/0018561 A1 | 1/2003 | Kitchen et al. |

FOREIGN PATENT DOCUMENTS

| | | |
|---|---|---|
| EP | 0 399 850 B1 | 12/1995 |
| EP | 0 411 748 A2 | 12/1995 |
| WO | WO 99/19821 A1 | 4/1999 |
| WO | WO 00/39719 A1 | 7/2000 |
| WO | WO 00/58890 | 10/2000 |
| WO | WO 01/20508 A2 | 3/2001 |
| WO | WO 01/75658 A2 | 10/2001 |
| WO | WO 01/75751 A2 | 10/2001 |
| WO | WO 01/75752 A2 | 10/2001 |
| WO | WO 01/75753 A2 | 10/2001 |

OTHER PUBLICATIONS

Morris, J., *Forex goes into future shock* (Oct. 2001), *Euromoney*, pp. 1-7, U.K.

*Wall Street & Technology, The sun sets on a year of sweeping changes, giving rise to a new era in Financial Technology*, [online], [retrieved on Jan. 2, 2002]. Retrieved from the Internet <URL:http://www.lexis.com/research/retrieve?_m=e394ce759759a21b6eb34c0763bf9884&docnu . . . .

Wright, B., *Unlocking the C2C forex riddle* (Jul. 25, 2001), euromoney.com, pp. 1-3, U.K.

\* cited by examiner

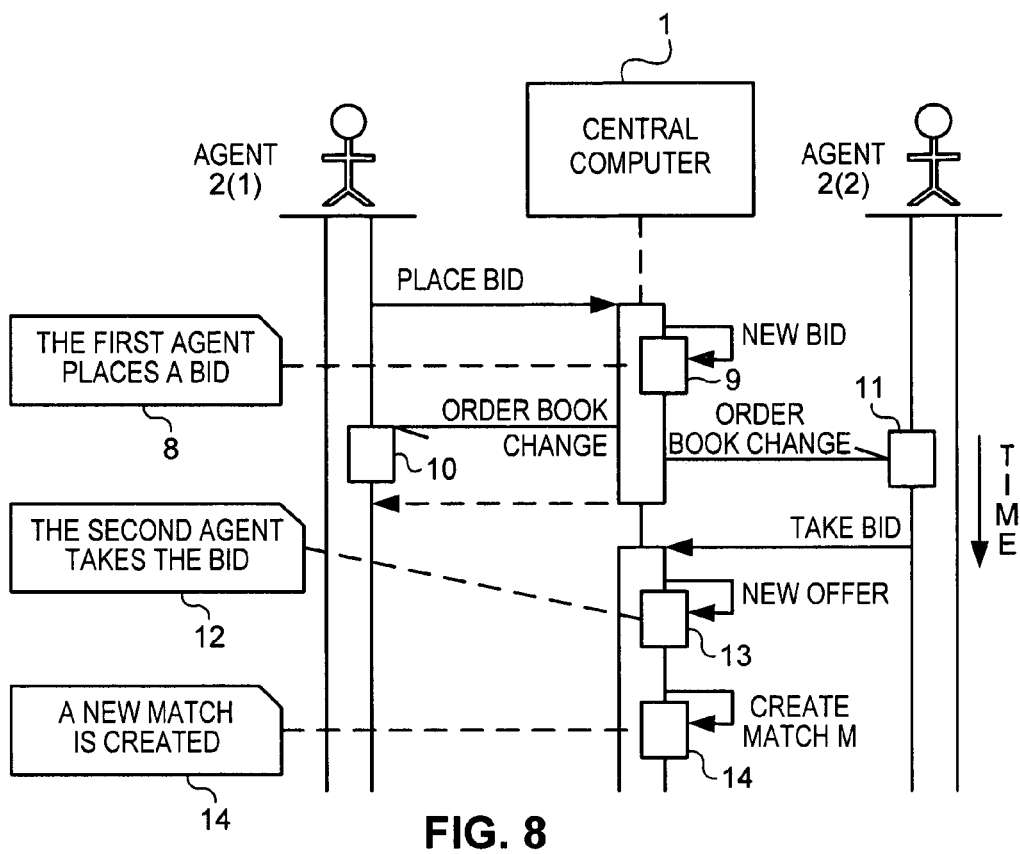
FIG. 8
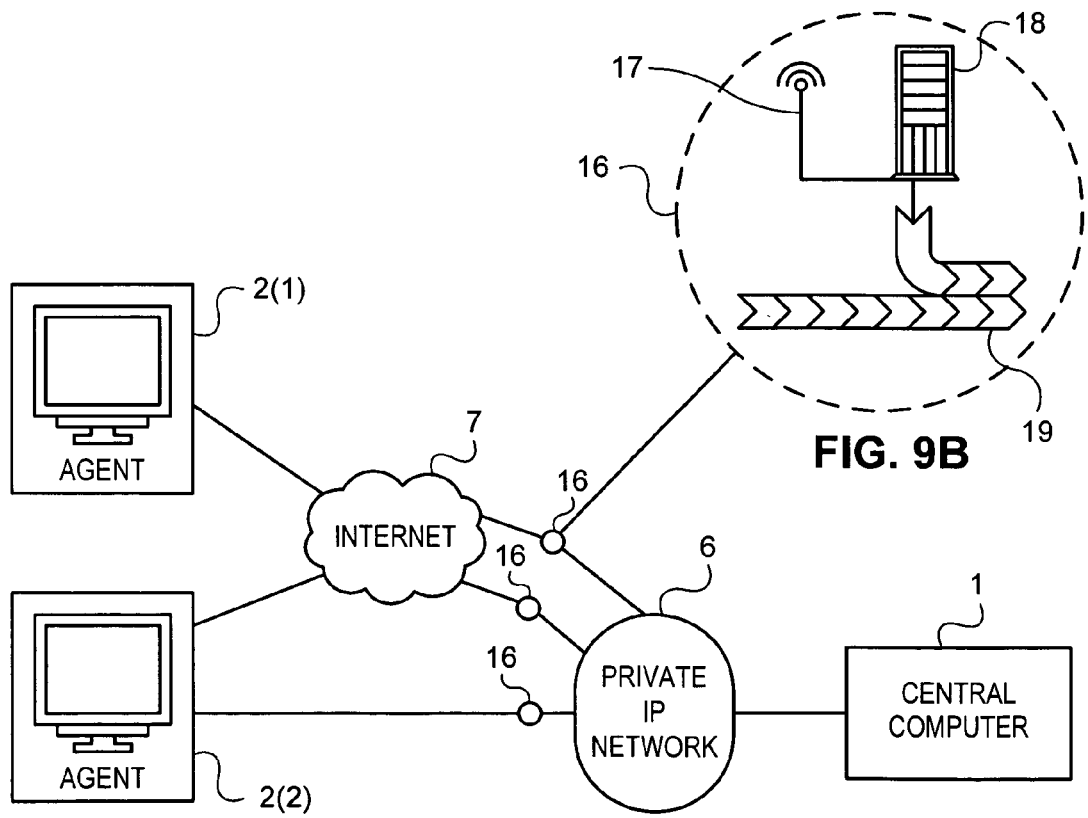
FIG. 9B
FIG. 9A

| Credit Exposure | | | | | | |
|---|---|---|---|---|---|---|
| instrum... ▽ | account | dir | counterpa... | min | current | max |
| EUR_USD | ACT804 | from | Bank 1 | -10 | 0 | 10 |
| GBP_USD | ACT804 | from | Bank 1 | -10 | -1 | 10 |
| USD_CAD | ACT804 | from | Bank 1 | -10 | 0 | 10 |
| USD_CHF | ACT804 | from | Bank 1 | -10 | 0 | 10 |
| USD_JPY | ACT804 | from | Bank 1 | -10 | 0 | 10 |

FIG. 15

Balance Sheet Detail

- balance sheet for credit node 101 (Client 1)
  - Thu 2 Aug: net -10,100 USD, receivable 1,419,900 USD, payable 1,430,000 USD [1,000,000 GBP@1.43]
    - group first by account/counterparty
      - ACT804@Bank 1: net -10,100 USD, receivable 1,419,900 USD, payable 1,430,000 USD [1,000,000 GBP@1.43]
    - group first by currency
      - USD: net 1,419,900 USD, receivable 1,419,900 USD, payable 0 USD
      - GBP: net -1,430,000 USD [-1,000,000 GBP@1.43], receivable 0 USD, payable 1,430,000 USD [1,000,000 GBP@1.43]
  - Tue 31 Jul: net -13,343 USD, receivable 11,418,279 USD, payable 11,431,621 USD
    - group first by account/counterparty
    - group first by currency
      - USD: net 6,419,900 USD, receivable 6,419,900 USD, payable 5,000,000 USD
      - GBP: net -1,430,000 USD [-1,000,000 GBP@1.43], receivable 0 USD, payable 1,430,000 USD [1,000,000 GBP@1.43]
      - GBP in ACT804@Bank 1: net -1,430,000 USD [-1,000,000 GBP@1.43], receivable 0 USD, payable 1,430,000 USD [1,0
        - Pay 1,000,000 GBP 2001-07-31 to ACT804@Bank 1, deal #384822 Fri 27 Jul 16:42:06
      - CAD: net -3,243 USD [-5,000 CAD@0.648508431], receivable 4,998,379 USD [7,707,500 CAD@0.648508431], paya

| flow # | deal # | deal time | rate | amount | counter amt | settlement | counte... | account |
|---|---|---|---|---|---|---|---|---|
| 384825 | 384822 | Fri 27 Jul 16:42:06 | 1.4199 | sold 1,000,000 GBP | bought 1,419,900 USD | Tue 31 Jul | Bank 1 | ACT804 |
| 384833 | 384830 | Fri 27 Jul 17:12:29 | 1.5415 | sold 1,000,000 USD | bought 1,541,500 CAD | Tue 31 Jul | Bank 1 | ACT804 |
| 384843 | 384840 | Fri 27 Jul 17:13:42 | 1.5415 | sold 1,000,000 USD | bought 1,541,500 CAD | Tue 31 Jul | Bank 1 | ACT804 |
| 384853 | 384850 | Fri 27 Jul 17:14:00 | 1.5415 | sold 1,000,000 USD | bought 1,541,500 CAD | Tue 31 Jul | Bank 1 | ACT804 |
| 384863 | 384860 | Fri 27 Jul 17:14:01 | 1.5415 | sold 1,000,000 USD | bought 1,541,500 CAD | Tue 31 Jul | Bank 1 | ACT804 |
| 384873 | 384870 | Fri 27 Jul 17:14:03 | 1.5415 | sold 1,000,000 USD | bought 1,541,500 CAD | Tue 31 Jul | Bank 1 | ACT804 |
| 384883 | 384880 | Fri 27 Jul 17:14:08 | 1.5425 | bought 1,000,000 USD | sold 1,542,500 CAD | Tue 31 Jul | Bank 1 | ACT804 |
| 384893 | 384890 | Fri 27 Jul 17:14:09 | 1.5425 | bought 1,000,000 USD | sold 1,542,500 CAD | Tue 31 Jul | Bank 1 | ACT804 |
| 384903 | 384900 | Fri 27 Jul 17:14:10 | 1.5425 | bought 1,000,000 USD | sold 1,542,500 CAD | Tue 31 Jul | Bank 1 | ACT804 |
| 384913 | 384910 | Fri 27 Jul 17:14:11 | 1.5425 | bought 1,000,000 USD | sold 1,542,500 CAD | Tue 31 Jul | Bank 1 | ACT804 |
| 384923 | 384920 | Fri 27 Jul 17:14:13 | 1.5425 | bought 1,000,000 USD | sold 1,542,500 CAD | Tue 31 Jul | Bank 1 | ACT804 |
| 384935 | 384932 | 05:02:37 | 1.4199 | sold 1,000,000 GBP | bought 1,419,900 USD | Thu 2 Aug | Bank 1 | ACT804 |

FIG. 16

GLOBAL ELECTRONIC TRADING SYSTEM

RELATED APPLICATIONS

This application is a divisional of U.S. patent application Ser. No. 10/005,609, filed Nov. 7, 2001 and is also related to and claims priority upon U.S. provisional patent application Ser. No. 60/249,796 filed Nov. 17, 2000 and U.S. provisional patent application Ser. No. 60/288,310 filed May 2, 2001, which patent applications are hereby incorporated by reference in their entireties into the present patent application.

TECHNICAL FIELD

This invention pertains to the field of global electronic trading of commodities and financial instruments.

BACKGROUND ART

Wright, Ben, "Unlocking the C2C forex riddle", euromoney.com, Jul. 25, 2001, U.K., provides a general discussion of some of the business aspects of the present invention.

Morris, Jennifer, "Forex goes into future shock", *Euromoney*, October 2001, gives a general description of several computerized foreign exchange platforms, including one described in the present patent application.

Ahuja, R. K., Magnanti, T. L., and Orlin, J. B., *Network Flows; Theory, Algorithms, and Applications*, Chapters 7 and 9 (Prentice-Hall, Inc. 1993), U.S.A., sets forth some algorithms that may be useful in implementing the present invention.

U.S. Pat. No. 5,375,055 discloses a relatively simple trading system that is capable of implementing only single-hop trades. On the other hand, the present invention can accommodate multi-hop trades. Further, in U.S. Pat. No. 5,375,055, the user is given information that suggests to him that he can take a trade when he may not have enough credit to take the whole trade. In the present invention, on the other hand, if only part of a trade can be executed, that information is given to the user; the user knows that he has enough credit to execute at least the best bid and best offer that are displayed on his computer.

An even simpler trading system is disclosed in European patent application 0 411 748 A2 and in granted European patents 0 399 850 B1 and 0 407 026 B1, all three of which are assigned to Reuters Limited. These Reuters documents describe a system in which information concerning a potential trade is displayed even if the user can't execute it at all. In the present invention, such a potential trade would not be displayed at all. Furthermore, the only credit limits that can be accommodated in the Reuters system are volume limits for the purposes of limiting settlement risk. In the present invention, any agent may set credit limits in multiple ways so as to limit not only settlement risk (measured both by individual instrument volumes and by notional absolute values) but also exposure risk. Furthermore, the Reuters keystations require a human operator. In the present invention, on the other hand, an API (application programming interface) enables any participant to develop programs which partially or fully automate the trading process.

DISCLOSURE OF INVENTION

Methods, systems, and computer readable media for facilitating trading two items (L,Q) from the group of items comprising commodities and financial instruments. At least two agents (2) want to trade some instrument L at some price quoted in terms of another instrument Q. The exchange of L and Q is itself a financial instrument, which is referred to as a traded instrument. A trading channel (3) between the two agents (2) allows for the execution of trades. Associated with each channel (3) are trading limits configured by the two agents (2) in order to limit risk. A central computer (1) coupled to the two agents (2) is adapted to convey to each agent (2) current tradable prices and available volumes for the exchange of L for Q and for the exchange of Q for L, taking into account the channel (3) trading limits. The central computer (1) facilitates trades that occur across a single trading channel (3) and trades that require the utilization of multiple trading channels (3).

BRIEF DESCRIPTION OF THE DRAWINGS

These and other more detailed and specific objects and features of the present invention are more fully disclosed in the following specification, reference being had to the accompanying drawings, in which:

FIG. 8 is a timeline illustrating an embodiment of the matching process used in the present invention.

FIGS. 9A and 9B are a block diagram illustrating an embodiment of the border outpost process of the present invention.

FIG. 15 illustrates a net exposure monitor 35.

FIG. 16 illustrates a balance sheet window 36.

DETAILED DESCRIPTION OF THE PREFERRED EMBODIMENTS

Figure 1:
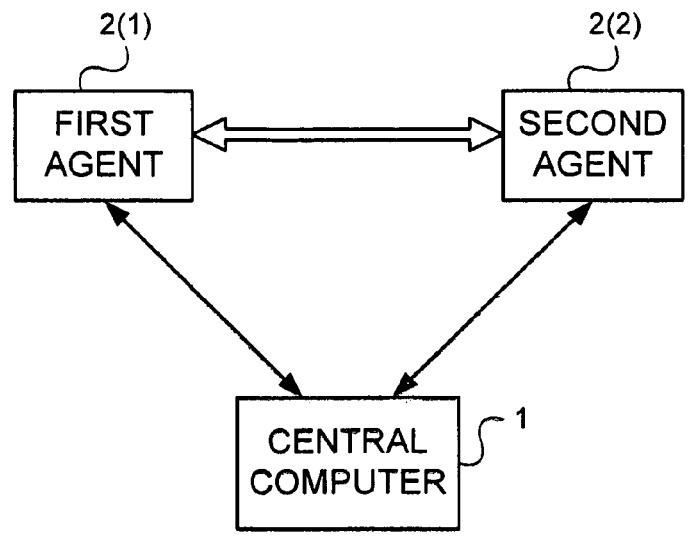
FIG. 1 is a block diagram illustrating a "type zero" trading system embodiment of the present invention.

The present invention enables an arbitrary number of agents 2 of arbitrary type (such as corporate treasuries, hedge funds, mutual funds and other collective investment schemes, banks and other financial institutions, and other institutions or persons) to trade commodities and financial instrument pairs directly amongst each other (thus facilitating client-to-client, or C2C trading) by making orders to their peers to buy and sell the traded instrument pairs over "credit atomic units" and "credit molecules".

By way of example, the application highlighted most often herein is the spot foreign exchange (spot FX) market, but it must be understood that the present invention has applicability to trading in any type of over-the-counter commodity or financial instrument, including physical commodities, energy products (oil, gas, electricity), insurance and reinsurance products, debt instruments, other foreign exchange products (swaps), and compound instruments and other derivatives composed or derived from these instruments.

A trade is the exchange of a lot of instrument L for a quoted instrument Q. The lot instrument L is traded in an integral multiple of a fixed quantity refered to as the lot size. The quoted instrument Q is traded in a quantity determined by the quantity of the lot instrument L and the price. The price is expressed as Q per L. In a spot FX trade, the lot instrument L and the quoted instrument Q are implicit contracts for delivery of a currency on the "spot" date (typically two business days after the trade date).

In the present specification and claims, entities that wish to trade with each other are referred to as "agents" 2. Agents 2 that extend credit to other agents 2 are referred to as credit-extending agents 5. Agents 2 that do not extend credit to other agents 2 are referred to as clients 4 or non-credit-extending agents 4.

Two agents 2 may have direct trading channels 3 between them, where the trading channels 3 correspond to credit extended from one credit-extending agent 5 (typically a bank, financial institution, or any clearing entity) to the other agent 2. Trading channels 3 are typically secured via placement of collateral (margin) or other form of trust by an agent 2 with the credit-extending agent 5. Typically, trading channels 3 amongst credit-extending agents 5 and non-credit-extending agents 4 already exist. In the spot FX market, these trading channels 3 are refered to as trading accounts. In the case that two credit-extending agents 5 have a trading channel 3 between them, only one agent 2 acts in a credit-extending capacity with regards to that trading channel 3.

Credit-extending agents 5 that allow the central computer 1 to utilize a portion of their trading channels 3 to allow other agents 2 to trade with each other are refered to as "credit-bridging agents" 5. In a preferred implementation of the present system, existing banks, financial institutions, and clearing entities are credit-bridging agents 5 as well as credit-extending agents 5; and existing trading customers of those institutions 5 are clients 4.

Compared with prior art systems, the present invention gives a relative advantage to clients 4 compared to credit-extending agents 5, by enabling one-way or two-way orders from any agent 2 to be instantly displayed to all subscribing agents 2, enabling a trade to take place at a better price, with high likelihood, than the price available to clients 4 under prior art systems. The present invention brings together clients 4 who may be naturally on opposing sides of a trade, without conventional spreads historically charged to them 4 by credit-extending agents 5 for their 5 service as middlemen. Of course, credit-extending agents 5 also benefit on occasions when they are natural sellers or buyers.

Unlike prior art systems, the present invention arranges multi-hop deals to match orders between natural buyers and sellers who need not have a direct trading relationship. For the application to spot FX trading, a multi-hop deal can be realized through real or virtual back-to-back trades by one or more credit-bridging agents 5. In terms of the underlying transfers of financial instruments, a multi-hop deal is similar to the existing practice of trade "give-ups" from one broker to another.

Unlike prior art systems, the present invention computes trading limits from not only cumulative volume but also from net position limits, where both volume and position limits may be set in terms of the traded instrument (instrument L for instrument Q), in terms of any underlying instruments to be exchanged (delivered) upon settlement (such as L individually, Q individually, or other instruments), or in terms of the notional valuations of such instruments. This allows all agents 2, especially credit-bridging agents 5, to control risk far more flexibly. Limiting traded or delivered instruments' cumulative volume helps to manage settlement risk. Limiting a traded instrument's net position (net L:Q position) helps to manage market risk. Limiting a delivered underlying instrument's net position (total net L, total net Q, or some other underlying instrument's position) helps manage market and credit risk by reflecting the ultimate effect of any trade on any account's future balance sheet. The cumulative volume limits allowed by prior art systems are able to address only settlement risk concerns.

The present invention has a natural symmetry; in the preferred implementation, not only are credit-bridging agents 5 (financial institutions) able to operate as market makers and post one-way (just a bid or ask) and two-way (both bid and ask) prices to agents 2, but clients 4 may post one-way and two-way prices to credit-bridging agents 5 and other clients 4 of any other credit extending or credit bridging agent 5. This symmetry is not present in prior art trading systems.

The present invention uses a central computer 1 to calculate trading limits, to prepare custom limit order books 24,25, and to match orders, but all post-trade bookkeeping and settlement is handled in a de-centralized manner by the counterparties 2 involved in each trade. The central computer is a network of at least one physical computer acting in a closely coordinated fashion.

Every agent 2 subscribing to a system employing the present invention can be thought of as a node 2 in an undirected graph (FIGS. 1–5, 10). The undirected edges 3 of such graphs indicate the existence of a trading channel 3 (account) between two nodes 2, typically an arrangement of trading privileges and limits based on the extension of credit from one node 2 to another 2 and likely backed by collateral placed by one node 2 with the other 2. Some nodes 5 in the graph, corresponding to credit-bridging agents 5, allow credit to be bridged, while other nodes 4 are clients 4 who permanently or temporarily forbid credit bridging. For the application to spot FX trading, a credit-bridging agent 5 authorizes the central computer 1 to initiate back-to-back spot trades, where simultaneous trades in opposite directions at the same price are made between the credit bridging agent 5 and two or more different agents 2, such that the net position effect to the credit bridging agent 5 is exactly zero.

For each trading channel (account) 3, the central computer maintains a set of limits set by the credit-extending agent 5 and a set of limits set by the non-credit-extending agent 2. Either of these sets of limits may be empty. These limits specify maximums of cumulative volume of each traded instrument L:Q, maximum cumulative volume of an underlying instrument (e.g. L, Q, or other), maximum cumulative notional value (e.g. U.S. dollar equivalent), maximum positive or negative net position of each traded instrument L:Q, maximum positive or negative net position of the underlying instrument (e.g. L, Q, or other), and maximum absolute net notional position (e.g., U.S. dollar equivalent) value total.

For each trading channel (account) 3, the central computer 1 maintains information sufficient to compute the current value of all the quantities upon which limits may be placed. The cumulative volume values are reset to zero with some period, typically one business day, at such a time as is agreeable to both agents. It is illustrative to note that the cumulative volume values always increase toward their limit with each trade, while the net position values may be decreased back to zero or near zero and may change in sign.

An agent 2 may add, remove, or adjust any of the elements of the set of limits specified by that agent 2 at any time.

Since trading is permitted or denied based on these limit-related values, the central computer 1 provides a way for the agents 2 that are parties to an account to inform the central computer 1 of any external activity that would affect these values, such as odd-lot trades and trades made through existing trading devices, or to simply reset all limit-related values to a predefined state.

Based on the current values of all these limit-related quantities, the central computer 1 computes for each traded instrument L:Q a directed graph (FIG. 6) of maximum excursions. In the directed graph for each traded instrument L:Q, each directed edge 3 from a node 2 to another node 2 has a value that indicates, based on the current position, how many of the traded instrument L:Q may be bought by the first node 2 from the second node 2. There are typically directed edges 3 in both directions between any pair of nodes 2, since the instrument L:Q may be bought or sold. The trading limit values (maximum excursions) of these buying and selling edges 3 between two nodes 2 vary from moment to moment as trades are made and/or credit limits are adjusted by either node 2.

For all traded instruments L:Q and for all nodes 2 that trade L:Q and for all other nodes 2 that trade L:Q, the central computer 1 uses the directed graph of maximum excursions (FIG. 7) to compute the maximum flow from the first node 2 to the second node 2. Note that this means that each pair of nodes 2 that trade L:Q will have the maximum flow between them 2 calculated in both directions.

The prior art systems could be simulated by the present invention by first eliminating the ability of any node 2 to be a credit-bridging agent 5 so that the "single-pair maximum flow" is merely the flow enabled by directed edges 3 connecting the pair of nodes 2 directly. Second, all trading limits by non-credit-extending agents 4 would be disabled and only cumulative volume limits on underlying instruments would be allowed for credit-extending agents 5, corresponding to limits only on settlement risk.

For purposes of illustrating the present invention, consider, for example, an agent A extending credit to agent B for the purposes of trading spot FX using the present invention, and between the U.S. dollar (USD), Euro (EUR), and Japanese Yen (JPY) in particular. Suppose agent B buys 1 lot of EUR:USD at 0.9250, then sells 1 lot of EUR:JPY at 110.25, with both trades having agent A as counterparty 2. The first trade will upon settlement result in 1,000,000 EUR received by agent B and 925,000 USD paid by agent B, while the second trade will result in 1,000,000 EUR paid by agent B and 110,250,000 JPY received by agent B. From the perspective of agent B, the account stands +1M EUR toward the EUR:USD cumulative volume limit, +1M EUR toward the EUR:USD net position limit, +1M EUR toward the EUR:JPY cumulative volume limit, −1M EUR toward the EUR:JPY net position limit, +2M EUR toward the EUR cumulative volume limit, +925,000 USD toward the USD cumulative volume limit, +110,250,000 JPY toward the JPY cumulative volume limit, ZERO with respect to the EUR net position limit, −925,000 USD toward the USD net position limit, and +110,250,000 JPY toward the JPY net position limit. Further supposing that the instrument valuations in agent B's home currency of USD are 0.9200 EUR:USD and 0.009090 JPY:USD, then the account stands (2M×0.9200+925,000+110,250,000×0.009090=) 3,767,172.50 USD toward the notional USD cumulative volume limit (useful for limiting settlement risk), and (0×0.9200+925,000+110,250,000×0.009090=) 1,927,172.34 USD toward the absolute notional net position total.

Now suppose agent B buys 1 lot of USD:JPY at 121.50, which upon settlement will result in 1,000,000 USD received and 121,500,000 JPY paid. The net single-instrument positions are now 0 EUR, 75,000 USD, and −10,250,000 JPY. Rather than delivering JPY at settlement (which will entail carrying a JPY debit balance in the account), agent B will probably choose to arrange an odd-lot deal with agent A to buy 10,250,000 JPY at a rate of, for instance, 121.40 USD:JPY, at a cost of 84,431.63 USD, resulting in final account position values of 0 EUR, −9,431.63 USD, and 0 JPY. In other words, agent B has lost 9,431.63 USD in its account with agent A once all the settlements occur.

Alternatively, agent B may choose to "roll forward" any EUR or JPY net position from the spot date to the next value date, or to any forward date by buying or selling an appropriate FX swap instrument from or to agent A.

Odd-lot spot, odd-lot forward, odd-lot swap, and deals with a specific counterparty 2 are not amenable to trading via the "limit-order book" matching system, but instead may be facilitated by the central computer 1 through a request-for-quote mechanism. Since the central computer 1 knows the net positions of all the accounts, it may further recommend such deals on a periodic basis, such as a particular time that both agents 2 consider to be the end of the business day for the account in question.

For the application of the present invention to markets other than spot FX, triangular interactions between traded instrument pairs are not as much a concern. The limits set by credit-extending agents 5 are handled the same way, where the limits on commodity holdings or currency payments are translated by the central computer 1 into excursion limits (how many lots an agent 2 may buy or sell) in real-time.

The present invention can be implemented in a combination of hardware, firmware, and/or software. The software can be written in any computer language, such as C, C++, Java, etc., or in a combination of computer languages. The hardware, firmware, and software provide three levels of content: a) trade screens, b) post-trade content for back offices and clearing units, and c) real-time credit management content. Through an API (application programming interface) 38, agents 2 can securely monitor and change in real time the credit limits they have specified for each trading channel 3 in which they participate. (Note that the maximum flow across a trading channel 3 is the minimum of the trading limits specified by the two agents 2 associated with the channel 3, so a non-credit-extending agent 4 can only further reduce the credit limits assigned by the credit-extending agent 5.)

Figure 7:
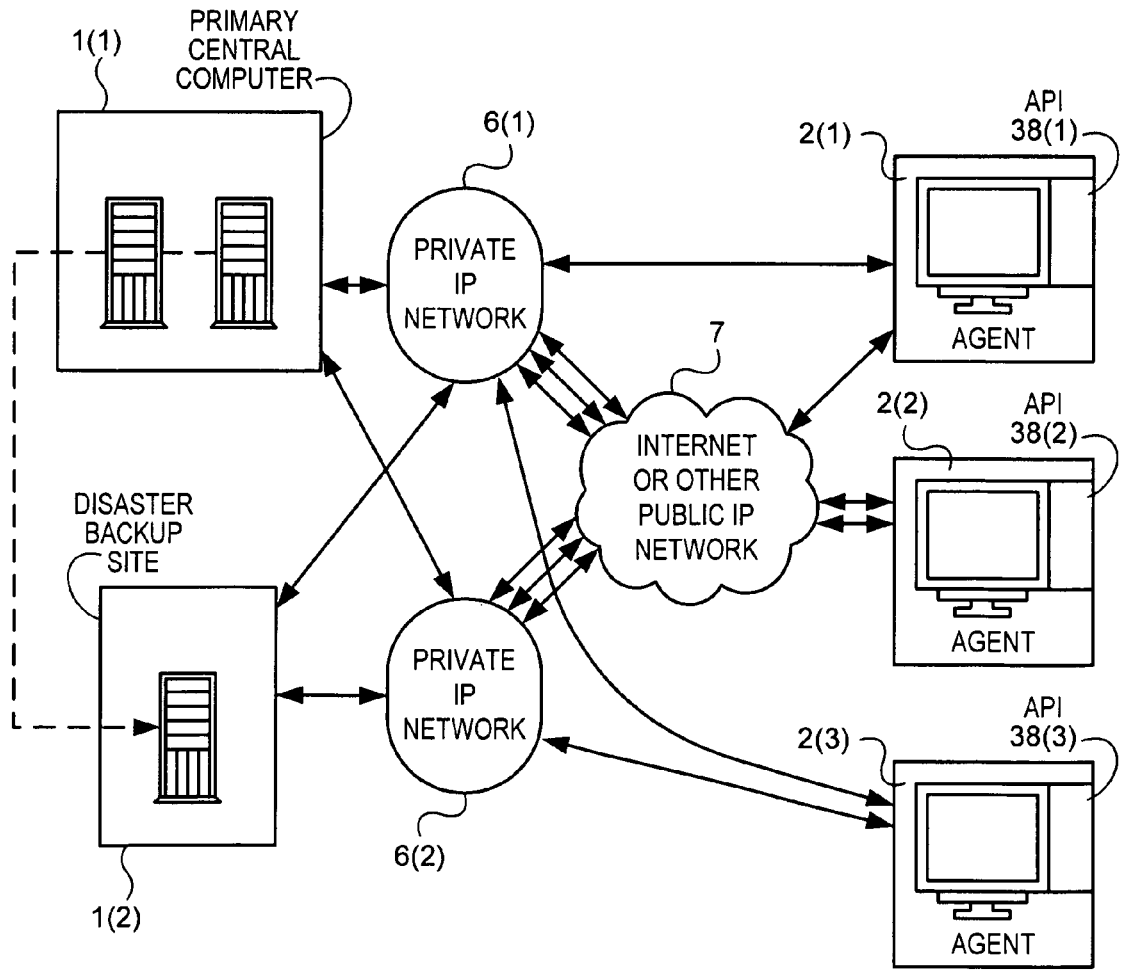
FIG. 7 is a block diagram illustrating various ways that agents 2 can be connected to enable them to use the present invention.

The link between the agents 2 and the central computer 1 can be any telecommunications link—wired, wireless, Internet, private, etc. Computer 1 can be located anywhere in the world. It can be mirrored for purposes of data backup, to increase throughput, or for other reasons; in that case, there is a second central computer 1(2). The backup central computer 1(2) is a network of at least one physical computer operating in a closely coordinated fashion. Such a backup computer 1(2) is shown in FIG. 7, and insures that there will be no interruption of service with hardware, software, or network 6,7 failures (neither during the failure nor during the needed repairs); and further insures that the present invention has the ability to recover from a disaster event.

Since the present invention operates on a global scale, said operation has to satisfy local laws and regulations to enable the services of the present invention to be provided. The present invention is therefore designed to enable such accommodations to be made.

The present invention supports purpose-specific "atomic units" enabling trading between specific types of agents 2. The basic atomic units are "type 0", "type 1", and "type 2", where a "type 0 unit" involves a single pair of agents 2 where one extends credit to the other, a "type 1 unit" involves a single client 4 trading with a collection of credit-extending agents 5, and a "type 2 unit" involves a single credit-bridging agent 5 enabling a collection of its clients 4 to trade with itself 5 and with each other 4.

FIG. 1 illustrates the simplest atomic unit, type 0. A first agent 2(1) and a second agent 2(2) wish to trade at any given time some number of round lots of instrument L in exchange for a quantity of another item Q, which we refer to as the quoted instrument or quoted currency. A trading channel 3 (account) between the two agents 2 allows for the execution of the trades and settlement of the underlying instruments. Inherent in the trading channel 3 are flow limits (trading limits) on the items L,Q being traded and limits on any underlying instruments exchanged upon settlement of the L,Q trade. A central computer 1, under control of the operator or owner of the system, is coupled to the two agents 2. The computer 1 is adapted to convey to each agent 2 current bid orders and offer orders originating from the other participating agent 2. The current set of tradable bid and offered prices and sizes is constrained by the trading channel's trading limits, and is preferably conveyed in the form of a custom limit order book 24,25 for each agent 2, as will be more fully described below. The custom limit order book 24, 25 is a chart, typically displayed on the agent's computer, of a preselected number of bids and offers for the instrument pair L,Q in order of price, and within price, by date and time (oldest first).

Typically, but not necessarily, each agent 2 is coupled to the central computer 1 when the agents 2 are trading. The identification of one of the two agents 2 as the "credit-extending agent 5" is necessary only for the creation of a trading channel 3, since either agent 2 may post orders (making the market) in the same way.

Figure 2:
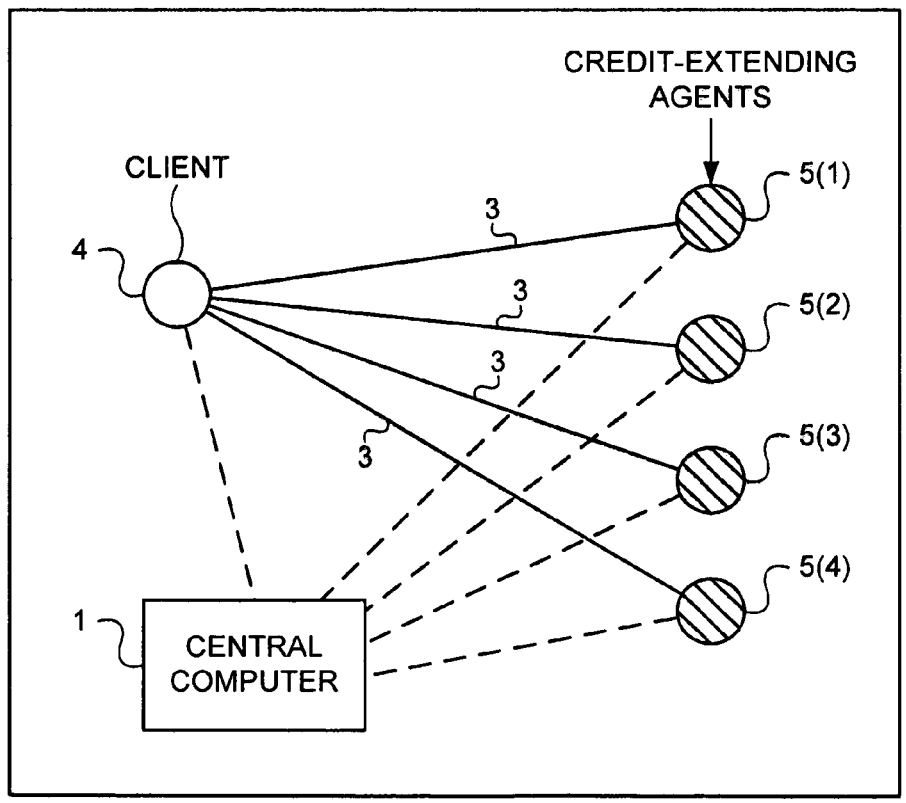
FIG. 2 is a block diagram illustrating a "type 1" trading system embodiment of the present invention.

FIG. 2 illustrates the type 1 atomic unit: a client agent 4 is looking to trade with several credit-extending agents 5 with whom it 4 has a credit relationship. Note that because each credit-extending agent 5 participates in only a single trading channel 3 (with which the central computer 1 is aware), there is no opportunity for the credit-extending agents 5 to act as credit-bridigng agents 5. The type 1 scenario involves the client 4 placing a one-way or a two-way order via computer 1. Computer 1 insures that every institution 5 with which the client 4 has a credit relationship sees the order instantaneously. If none of the institutions 5 wish to deal at the client's current price, they 5 may post their own counter-offers that then appear on the client's custom limit order book 24,25, but not on those of the other institutions 5. The client 4 may then choose to modify or cancel its 4 order to deal at the best price possible, while the institutions 5 benefit by seeing this client's 4 possible interest in buying or selling.

The institutions 5 may also supply via computer 1 tradable bid and offered prices to the client 4 that will not be seen by the other institutions 5.

The solid lines in FIG. 2 represent credit relationships between client 4 and credit-extending agents 5. The credit-extending agents 5 may have credit relationships outside the scope of the present invention, but only those trading channels 3 whose credit limits are maintained by the central computer 1 are illustrated or discussed. The dashed lines in FIG. 2 represent communication links between the agents (4,5) and the central computer 1.

As a sub-species of type 1, there can be multiple clients 4, as long as all such clients 4 have credit relationships with the same credit-extending agents 5, and the clients 4 are not allowed to trade with each other 4.

Computer 1 provides several post-trade capabilities to the client 4 and to the financial institution's 5 trading desk as well as to its 5 back office and credit desk, all in real-time.

The clearing of the trade is done by conventional means. The operator of computer 1, though it could, does not need to act as a clearing agent and does not need to hold as collateral or in trust any financial or other instruments. The client 4 can direct that all clearing is to be handled by a certain credit-extending agent 5. The clearing procedures are dependent upon the instruments traded and any netting agreements or special commodity delivery procedures required for those instruments.

Figure 3:
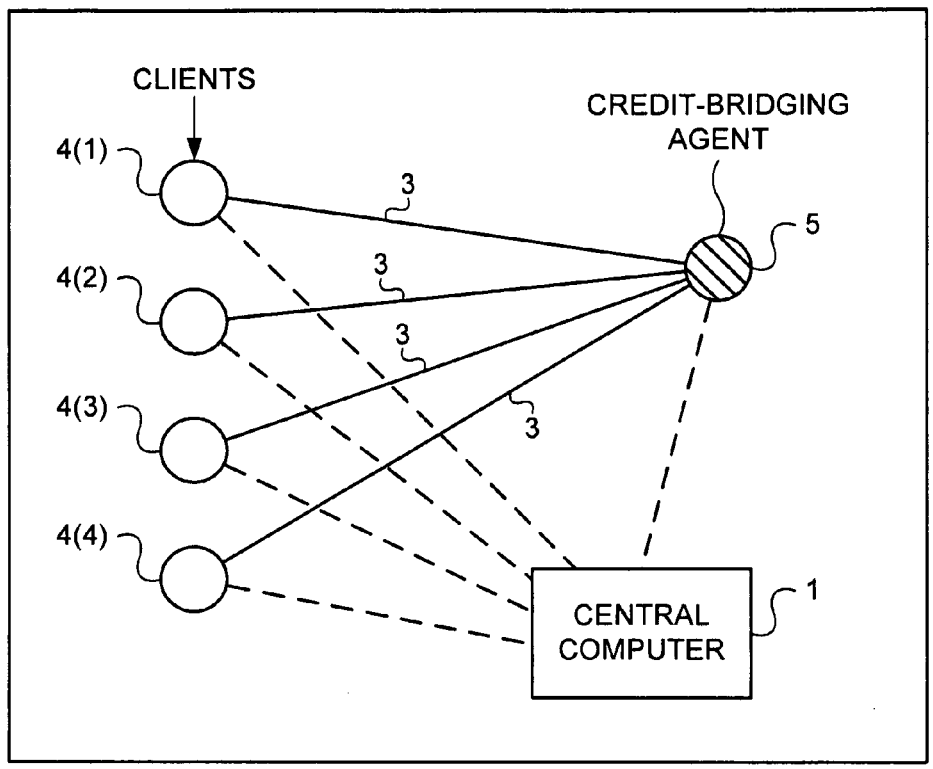
FIG. 3 is a block diagram illustrating a "type 2" trading system embodiment of the present invention.

The type 2 atomic unit is illustrated in FIG. 3. Type 2 enables client 4 to client 4 dealing among the clients 4 of a particular credit-bridging agent 5, as well as enabling client 4 to credit-extending agent 5 trading. As usual, the anonymous order-matching process is triggered whenever an order to buy is made at a price equal to or higher than the lowest outstanding offer to sell, or vice versa. If the match is between a client 4 and the credit-bridging agent 5, then a single deal is booked between those two parties 2. However, if the match is between two clients 4, then two back-to-back deals are booked, one between the seller client 4 and the credit-bridging agent 5, and the other between the buyer client 4 and the credit-bridging agent 5. This is akin to creating virtual trading channels between the clients 4. A client 4 who has a credit relationship with the credit-bridging agent 5 is able to post its one-way or two-way order via computer 1, which causes the order to be instantly displayed to all other clients 4 and to the credit-bridging agent 5 itself if the existing credit limits between the posting client 4, the credit-bridging agent 5, and the receiving client 4 would allow a portion of the order to be executed.

This "mini-exchange" has the liquidity of the natural supply and demand of the entire client 5 base, combined with the market-making liquidity that the credit-bridging agent 5 would be supplying to its clients 4 ordinarily. It is certainly expected, and beneficial to the overall liquidity, that the credit-bridging agent 5 will be able to realize arbitrage profits between the prices posted by its clients 4 and the prices available to the credit-bridging agent 5 through other sources of liquidity. In fact, there may be instances in some markets where clients 4 are also able to arbitrage against other trading systems.

Again, computer 1 provides several post-trade capabilities to the client 4 and to the trading desk, the back office, and the credit desk of the credit-bridging agent 5, all in real-time, as in type 1.

Figure 4:
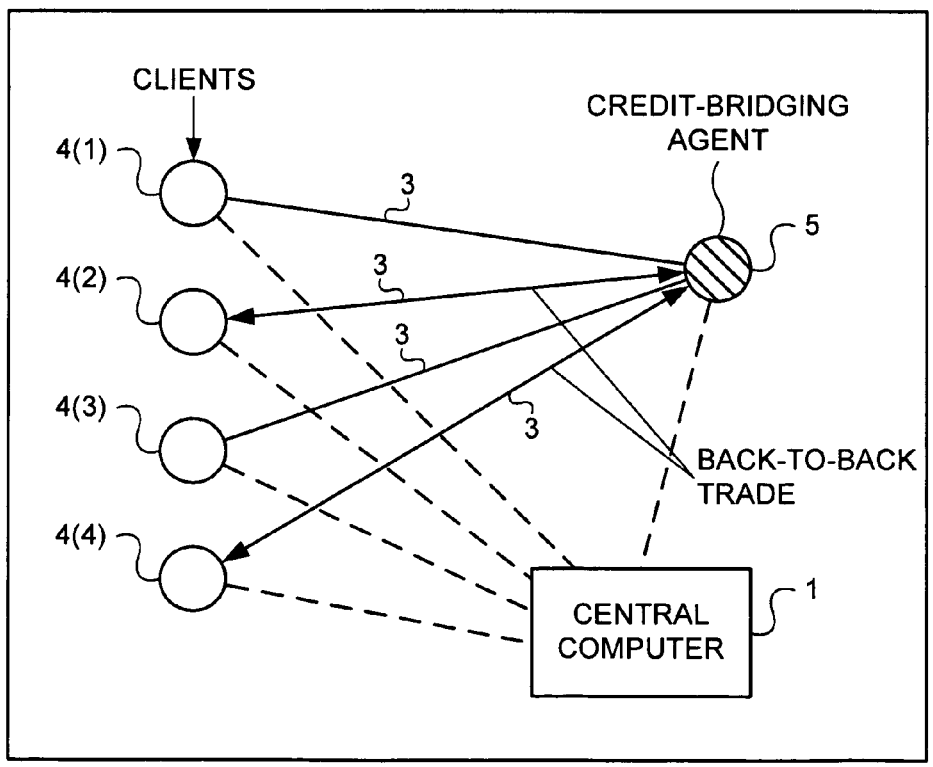
FIG. 4 is a block diagram illustrating a "type 2" back-to-back trade using the present invention.

A pair of back-to-back trades is illustrated in FIG. 4, showing that agents 4(2) and 4(4) are the ultimate buyer and seller of the deal, but they each deal only with the credit-bridging agent 5 as their immediate counterparty 2.

As with all the various atomic units, central computer 1 updates the current tradable information after each trade, and causes this information to be displayed on the computers associated with all of the subscriber agents 2.

Again, computer 1 provides several post-trade capabilities to the clients 4, as well as to the credit-bridging agent's 5 trading desk, its 5 back office, and its 5 credit desk, all in real-time. The credit-bridging agent 5 acts as a clearing agent for this trade, and is able to monitor the client-to-client exposure, in real time.

Thus is created a price-discovery mechanism for end-users 2 with direct transparency between entities 2 wishing to take opposite sides in the market for a particular instrument. The present invention encompasses decentralized operation of an arbitrary number of separate, type-1 and type-2 atomic units. Efficient price discovery is provided to the end user 2 in a decentralized liquidity rich auction environment, leveraging existing relationships, and co-existing with and indeed benefiting from traditional trading methodologies.

Figure 5:
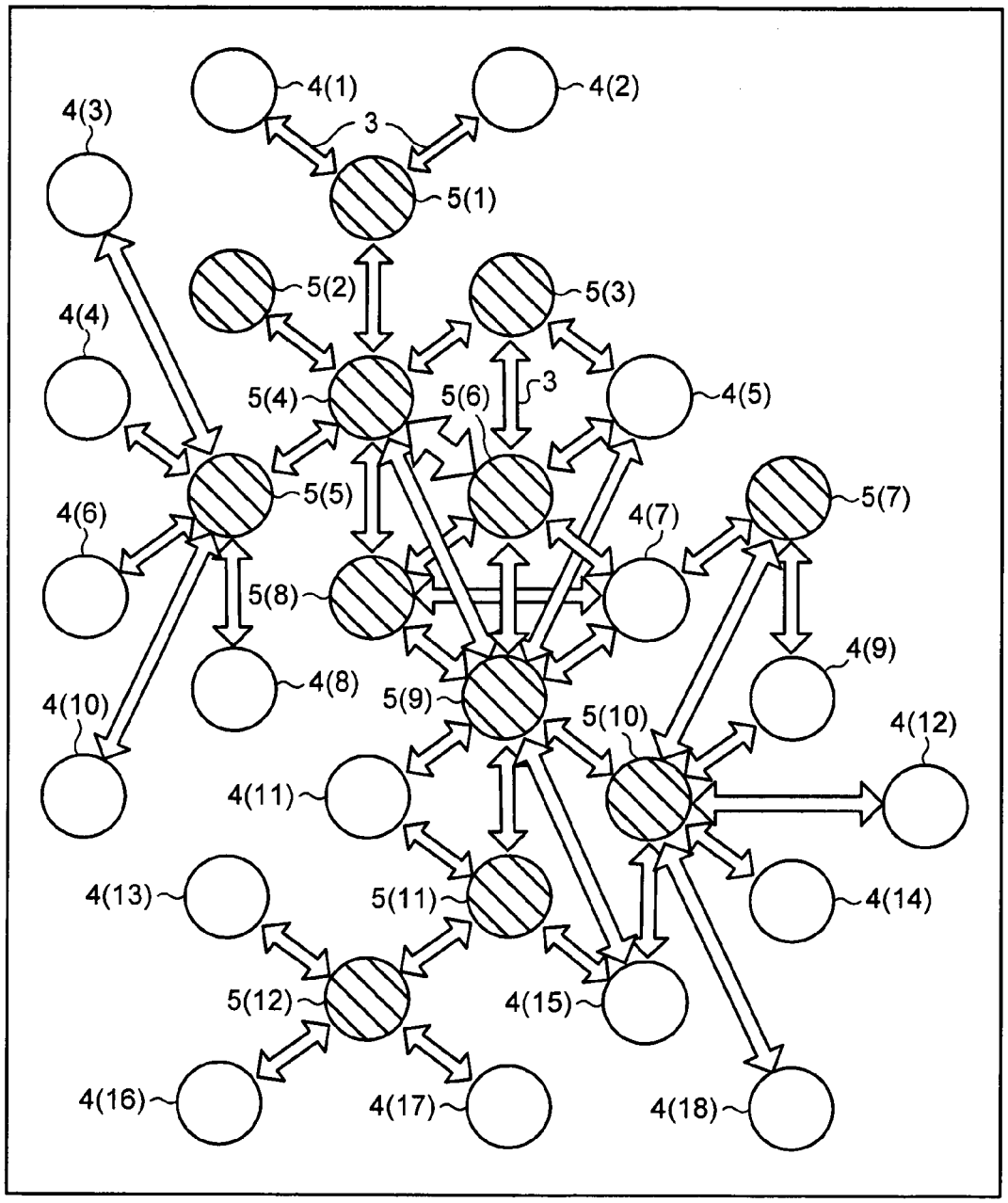
FIG. 5 is a block diagram illustrating an interlocking network of type 1 and type 2 atomic units.

Furthermore, an arbitrary number of different type 0, type 1, and type 2 atomic units may be interconnected, bottom-up, as illustrated in FIG. 5, to provide, at all times, a liquidity rich efficient price-discovery mechanism to the subscribing agents 2, enabling more and more agents 2, across different atomic types, to conduct efficient direct auctions with each other directly. The various atomic units may be interconnected into a molecular credit-network.

In FIG. 5, which may be considered to illustrate a "type 3" scenario, shaded circles represent credit-bridging agents 5 and un-shaded circles represent clients 4.

For purposes of simplicity, central computer 1 is not shown on FIG. 5, but is in fact coupled to all nodes 2. Each node 2 has proprietary client software on a computer associated with said node 2, enabling said node 2 to communicate with central computer 1. Such software may take the form of a Web browser. The diameters of the arrow-headed lines 3 represent instrument excursion limits deduced from each trading channel's various types of credit limits. A "shortest weighted paths" algorithm or other minimum cost flow algorithm is used to calculate the minimal path between two agents 2 subject to credit flows to enable a trade between the agents 2. The trading agents 2 may be arbitrarily removed from one another, both in geographic terms as well as by type of business activity in which they 2 are involved.

Each connected piece of FIG. 5 maintains full transparency of orders posted on computer 1 to all financial institutions 5 and clients 4 who are on any unexhausted credit path 3 to the posting entity 2. Each of the entities 2 who are able to see the posted order are in effect competing, through the reverse auction, for that particular deal, enabling further efficient price-discovery to the posting entity 2.

Prior to each trade, computer 1 internally computes the values that define one of these FIG. 5 graphs for each pair of instruments being traded. From the graph, computer 1 creates a table of multi-hop trading limits showing the trading limits between each pair of nodes 2. From the table of multi-hop trading limits, computer 1 prepares a custom limit order book 24,25 for each node 2 for each traded instrument pair. After every trade, computer 1 recalculates the trading limits 3, thus leading to a new graph (FIG. 5) for that instrument pair. Recalculating the trading limits 3 for a given traded instrument pair can affect the topology (trading limits 3) of other graphs (FIG. 5) for other traded instrument pairs. This can occur, for example, when the trading limits are notional trading limits.

On FIG. 5, if an agent 2 has imposed its own internal limits that are smaller than the trading limits that have been imposed by a credit-extending agent 5 that is extending it 2 credit, computer 1 uses the smaller of the two limits when it creates FIG. 5.

Each trading channel 3 represents an account between a credit-extending agent and a client agent 4. In the preferred implementation of this invention, all credit-extending agents are credit-bridging agents 5. Even when two adjacent nodes 2 are fully qualified to be credit-extending agents 5, one acts as the credit-extending agent 5 in the transaction and the other acts as the client agent 4 in the transaction. The accounts that exist between credit-extending agents 5 and client agents 4 comprise specified input credit limits, balance holdings, and collateral; computer 1 calculates trading limits from this information.

The operator of computer 1 typically has, in its standard agreement with a subscribing agent 2, language stating that if the agent 2 has entered into a written subscription agreement with the operator of computer 1 and said agent 2 trades outside of the network 6,7 operated by the operator of computer 1, that agent 2 is obligated to notify the operator of computer 1 about such outside trades, so that computer 1 can recalculate the trading limits as necessary.

FIG. 5 can be thought of as an n-hop credit network, where n is an arbitrary positive integer. In any transaction, the instrument flow can fan out from one source node 2 and then collapse to the destination node 2; the instrument flow does not have to stay together as it flows from the source 2 to the destination 2. See FIG. 10 for an example of this phenomenon. In calculating the maximum capacity of the network 6,7, computer 1 uses a maximum flow algorithm such as one described in chapter 7 of the Ahuja reference cited previously. In determining the actual flow used to complete the trade, computer 1 uses a minimum cost flow algorithm such as one described in chapter 9 of said Ahuja reference, where the cost to be minimized is a function of the actual cost to execute the trade and other factors, such as projected settlement costs, flow balancing heuristics, and a randomizing component.

The network 6,7 of FIG. 5 is a non-disjointed network. By that is meant that every node 2 in the network 6,7 is coupled to at least one other node 2, and at least one of the agents 2 associated with each trading channel 3 is a credit-bridging agent 5. The individual trading limits 3 that computer 1 computes for each agent 2 pair are dependent upon the topology of the network 6,7. Computer 1 essentially transforms the network 6,7 into a virtually cliqued networked. A "cliqued network" is one in which every node 2 is connected to every other node 2. A "virtually cliqued network" is one in which every node 2 has a capability to trade with every other node 2, but not necessarily directly. In order to preserve the desired feature of anonymity, each node 2 knows the identities of only its immediate trading partners 2, and does not necessarily know whom 2 it is actually trading with.

As a trading system that leverages the existing relationships in the market for the traded instrument, the present invention provides all market players 2 (typically banks, financial institutions, clearing entities, hedge funds, and any corporations or other entities) the ability to trade directly with each other through a custom limit order book 24,25. These agents 2 may already be connected together with credit relationships, but prior art systems allow trading only between two parties that have an explicit credit arrangement. The present invention analyzes the credit-worthiness of a potentional counterparty 2 at a higher level, performing this analysis in real time, and providing each party 2 with a limit order book 24,25 customized to its 2 current credit availability.

Figure 6:
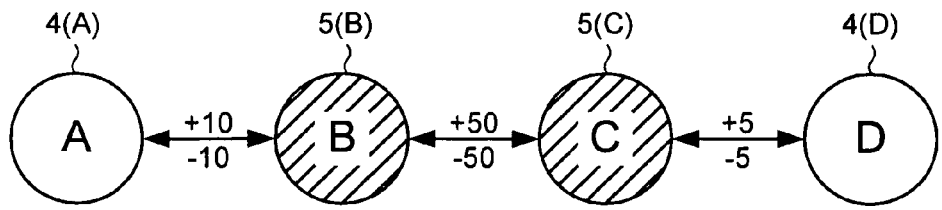
FIG. 6 is a schematic diagram illustrating trading limits for a traded instrument being traded between four agents 4,5 using three trading channels 3.

For example, in FIG. 6 we consider a small network of foreign exchange players: banks 5(B) and 5(C), which have a credit relationship with each other, and clients 4 (A) and 4(D), who have margin placed with banks 5(B) and 5(C), respectively (we leave the margin currency and traded instrument unspecified). The specified input credit limits are specified as traded instrument L:Q credit limits (just one way of specifying input credit limits out of eight possible ways enumerated in the present patent application). Client 4(A)'s margin allows it to trade +/− 10M with 5(B), 5(B)'s relationship allows it to trade +/− 50M with 5(C), and 5(D)'s margin allows it to trade +/− 5M with 5(C). This information is supplied to computer 1, which draws FIG. 6 from said information.

FIG. 6 illustrates a simplified type 3 network in which there are two client agents 4 and two credit-extending agents 5 which are also credit-bridging agents 5. FIG. 6 also illustrates the trading limits between each pair of coupled agents 4,5. Table 1 shows the maximum multi-hop credit limits that are then calculated by computer 1 for the simplified network of FIG. 6 as follows:

TABLE 1

|   | A | B | C | D |
|---|---|---|---|---|
| A | infinity | 10M | 10M | 5M |
| B | 10M | infinity | 50M | 5M |
| C | 10M | 50M | infinity | 5M |
| D | 5M | 5M | 5M | infinity |

Computer 1 then uses the information contained in Table 1 to create a custom limit order book 24,25 for each agent A, B, C, D, and causes the custom limit order book 24,25 to be displayed on the computer screen of the respective agent A, B, C, D. The filtered bids and offers in the custom limit order book 24,25 are for volumes that are an integral multiple of the lot size even if the computed Table 1 amounts contain values which are not integral multiples of the lot size, with non-integral multiples rounded toward 0.

If client A posts a bid for 10M, computer 1 causes the full bid to appear on the custom limit order books 24,25 of banks B and C, and computer 1 causes a filtered bid for 5M to appear on the custom limit order book 24,25 of client D, because the maximum credit (implicit or explicit) available between A and D is +/−$5M. If there is no implicit or explicit credit available between two nodes 2, they 2 are not allowed to see each other's bids and offers at all on their custom limit order books 24,25.

The network 6,7 of the present invention is preferably built using the Internet Protocol (IP) (because of its ubiquity), and may reside on the Internet itself or other public IP network 7 (FIG. 7).

It is also possible to locate part or all of the network 6,7 on a private fiber backbone 6, so that information bound for the Internet 7 can traverse most of the distance to its destination on the presumably higher speed private network 6. The slower public Internet 7 is then used for just the last segment of travel. It is also possible to provide clients 2 with dedicated bandwidth through private IP networks 6 in order to provide additional levels of quality and service. A single dedicated connection 6 may be backed up by an Internet connection 7, or multiple private connections 6 can be used to avoid the public network 7 entirely.

On FIG. 7, the three illustrated agents 2 can be three separate companies, three computers within the same company, or a hybrid of the above.

The network 6,7 interfaces with both people and automated systems (computers), so it provides three access methods:
- human—Graphical User Interface (standalone or browser-based application) for trading, interactive queries, and account management;
- human/computer—HTTP reports interface (HTML, XML, PDF, or Excel) for queries only;
- computer—Application Programming Interface 38 (available in Java and COBRA with bridges to FIX, JMS, SOAP, and ebXML) for trading, queries, and account management.

An agent's 2 software can be launched from the agent's 2 browser but run as a standalone application for better performance and stability.

The computer of each agent 2 can have associated therewith an application programming interface (API) 38. The API 38 is a standard interface exposed by the central computer 1 that enables the user 2 to write customized instructions enabling two-way communication between central computer 1 and the user 2. In the case where the user 2 is a credit extending agent 5, the API 38 can be used to update the agent's backoffice information. The agent 2 can program his API 38 to make and cancel orders (bids and/or offers). The agent 2 can use his API 38 to receive and reformat custom limit order books 24,25 for any instruments. The agent 2 can use his API 38 to set trading limits, with the understanding that the actual trading limits are the minimum of the trading limits specified by the two agents 4,5 associated with an account. The API 38 can be programmed to estimate how much it would cost an agent 2 to liquidate his position in an instrument. The API 38 can be programmed to estimate that agent's profit/loss amount for each instrument being traded; this information can be combined with the agent's custom limit order book 24, 25. Anything that can be achieved by the GUI (graphical user interface) (FIGS. 12–21) can be achieved via the API 38.

Any and all features of the API 38 can be programmed to operate automatically, including automatic bidding, offering, buying, and selling. Automated processes accessing computer 1 via application programming interface 38 or a bridge use the same cryptographic protocols as for a human agent 2 inputting instructions via his computer's GUI. Whether an API 38 or a GUI is used, an agent's private key for computerized access to computer 1 can-be stored in the agent's computer, provided said computer has sufficient security safeguards.

Privacy, authentication, and non-repudiation are achieved in the present invention via the use of cryptography in a variety of different forms. The cryptographic techniques can comprise symmetric key and/or asymmetric key (public key) cryptography. All data streams are encrypted, e.g., by using SSL (Secure Socket Layer) connections or a combination of SSL encryption with additional authentication and encryption. Authentication can be required between computer 1 and an agent 2 at any and all times these devices 1,2 communicate with each other. This authentication can be achieved through the use of digital certificates. Revalidation of credentials can be required at the time a trade is consummated.

Each agent 2 may store its private key on a tamper-resistant hardware device such as a smartcard, protected by a password. The combination of a physical token (the card) with a logical token (the password) ensures two levels of security. The hardware token may contain a small CPU that allows it to perform the necessary cryptographic operations internally, so that the agent's private key never leaves the smartcard. In a preferred embodiment, computer 1 handles bulk encryption/decryption using symmetric key cryptography after the slower public key cryptography has been used to exchange a session key between agent 2 and computer 1.

While trading in the present invention is peer-to-peer, order matching for any particular instrument is done at a centralized location 1 to maintain transactional integrity. FIG. 8 illustrates the order matching process. In step 8, the first agent 2(1) places a bid via its software to computer 1, which accepts the bid at step 9. Computer 1 then calculates changes to the custom limit order books 24,25 of agents 2(1) and 2(2) at steps 10 and 11, respectively, taking into account appropriate trading limits 3. At step 12, the second agent 2(2) takes the bid. Step 12 occurs right before step 13, in which a third agent 2(3) (not illustrated) posts a new offer (bid or offer) for the traded instrument L:Q. At step 14, computer 1 makes the match between the first agent 2(1) and the second agent 2(2).

Reporting of the trade is described below in conjunction with FIGS. 35 and 36.

A network 6,7 implementing the present invention can span the entire world, which means that there may be time differences for a message sent by different agents 2 to computer 1. Assuming a network 6,7 that sends signals at the speed of light but that cannot transmit through the Earth, a message sent to the other side of the Earth would have a round-trip time of at least 130 milliseconds. On existing IP networks, it is observed that if the central computer 1 were located in New York, the maximum average round-trip communication time between the central computer 1 and a computer in any of the major financial centers is less than 300 milliseconds.

We want to ensure that all agents 2 have a level playing field in accessing computer 1, regardless of where these agents 2 are situated around the world. Determining the latency for each agent 2 and then introducing an individual delay on an agent-by-agent basis to try to equalize time-of-arrival at computer 1 would be very difficult (due to short term fluctuations in network 6,7 lag), and could have the undesired effect of overcompensating. A malicious agent 2 could also falsify its network 6,7 delay, unfairly obtaining early access to computer 1.

In order to compensate for the various time lags in sending messages between agents 2 and computer 1 on a global basis, the present invention transmits information as rapidly as possible while flagging the order of messages to compensate for latency. The flagging is done by means of border outpost computers 16 (FIG. 9).

For agents 2 remote from computer 1, a border outpost computer 16 is inserted into the network 6,7, typically where the agent's data enters the private backbone 6 that connects to computer 1. Each border outpost computer 16 comprises a CPU 18, a trusted time source 17, and an input/output port 19. Time source 17, which may comprise a GPS clock accurate to a millionth of a second, is used to generate a digital time stamp that is added to each data packet before it is forwarded to computer 1. The GPS clocks 17 of all the border outpost computers 16 are synchronized with each other to a high degree of accuracy (typically one microsecond). The time stamp may be placed onto the packet without the border outpost computer 16 having to understand the packet or have access to its contents. At the computer 1 site, the time stamp is stripped off before the packet is processed, and then reassociated with the data after it is decrypted and parsed into a command. Computer 1 then sorts the messages into a queue by time order. After a fixed time delay, the message that is at the front of the queue is serviced by computer 1. The fixed time delay is chosen so that with a high degree of certainty a message from the remotest agent's 2 computer will arrive at computer 1 within the fixed time delay. The purpose of the fixed time delay is to allow all messages that might be the first-originated message to have a chance to arrive at computer 1 before execution of any messages takes place. The time stamp may be encrypted using either a symmetric or assymetric cipher, to prevent its modification or falsification.

Figure 10:
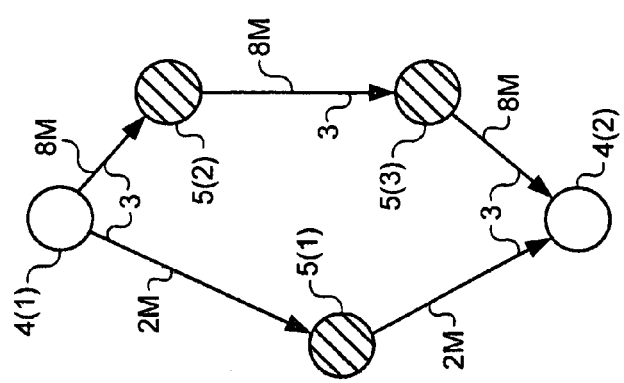
FIG. 10 is a deal fulfillment graph.

FIG. 10 is a deal fulfillment (flow) graph, illustrating the flow in the lot instrument. The lot instrument L is the portion of the traded instrument that has to be traded in a round lot, typically a multiple of a million. The quoted instrument Q is that portion of the instrument being traded that is expressed as the lot instrument times a price. In this example, agent 4(2) buys 10M Euros using U.S. dollars at an exchange rate of 0.9250 from agent 4(1). Since the Euro is the lot currency in this example, it has to be specified in a round lot (multiple of 1 million Euros). F(L), the lot size (volume), is 10 million and F(Q), the quoted volume, is 9,250,000. In this example, there are three intermediaries (middlemen): agents 5(1), 5(2), and 5(3). Only credit-bridging agents 5 can be middlemen. For purposes of simplification, we show on FIG. 10 the flow of just the lot instrument L. There is also a counterflow in the quoted instrument Q, which can be derived from the lot flow and the traded price. For example, on the edge 3 between node 5(1) and 4(2,) 2M represents the flow of 2 million Euros from agent 5(1) to agent 4(2), as well as the counterflow of 1,850,000 U.S. dollars from agent 4(2) to agent 5(1).

Figure 11:
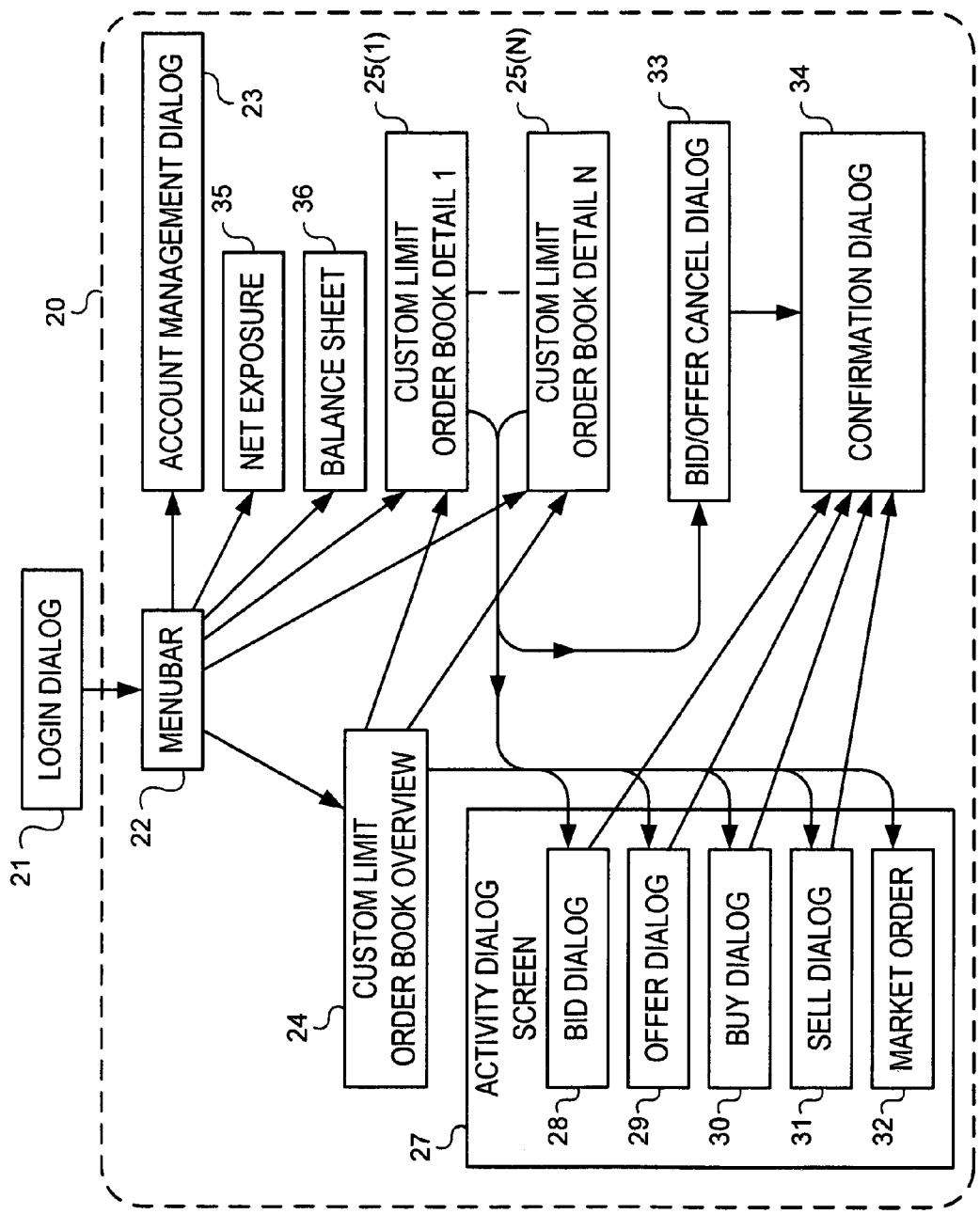
FIG. 11 is a flow diagram illustrating the sequence of screen shots appearing on the computer of an agent 2 using the present invention.

FIG. 11, a simplified focus change diagram, illustrates the sequence of screen shots appearing on the display of a computer of an agent 2 who is coupled to central computer 1. Agent 2 first encounters a log-in dialog box 21, then a menu bar 22 where he can select from an account management dialog box 23, a net exposure screen 35, a balance sheet 36, or his custom limit order book 24,25. From custom limit order book overview screen 24, agent 2 can navigate to one of N order book detail screens 25, or to an activity dialog screen 27, which can take the form of a bid dialog box 28, an offer dialog box 29, a buy dialog box 30, a sell dialog box 31, or a market order screen 32. As shown in FIG. 11, various of these screens can segue into a bid/offer cancel dialog box 33 or a confirmation dialog box 34.

FIGS. 12–21 illustrate most of the above screens. The login screen is shown (FIG. 12), followed by two shots of the main desktop (FIGS. 13 and 14) showing the custom limit order book overview window 24 and the custom limit order book detail window 25. The remaining screen shots (FIGS. 15–21) are of dialog boxes that can be activated from either the overview window 24 or detail order windows 25.

Figure 12:
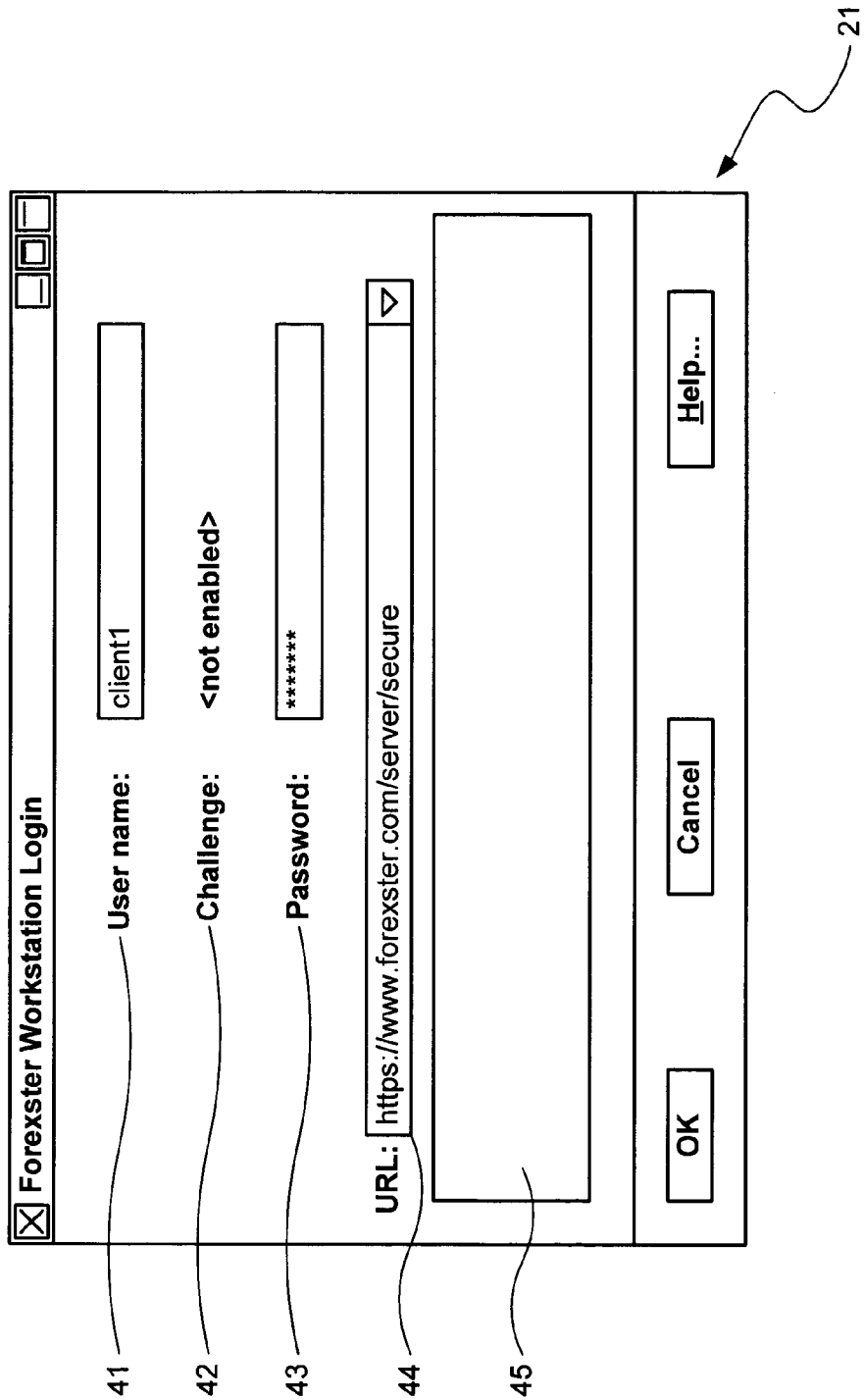
FIG. 12 illustrates a log-in screen 21 of the computer of an agent 2.

FIG. 12 illustrates log-in dialog box 21. Field 41 allows agent 2 to type in his name, thus identifying the account and trader. Field 42 is an optional challenge field, provided for security purposes. An appropriate response from the agent 2 to meet the challenge might include presentation of a password, key, or digital certificate via a hardware token. Field 43 is where agent 2 enters his password. Field 44 is where agent 2 enters the address of central computer 1. In the case of an Internet connection, the URL of computer 1 is specified here. The data exchange between agent 2 and central computer 1 is encrypted, e.g., by a SSL (Secure Socket Layer) connection. Field 45 is a scrolling message log showing status and notification of errors during the log-in process.

Figure 13:
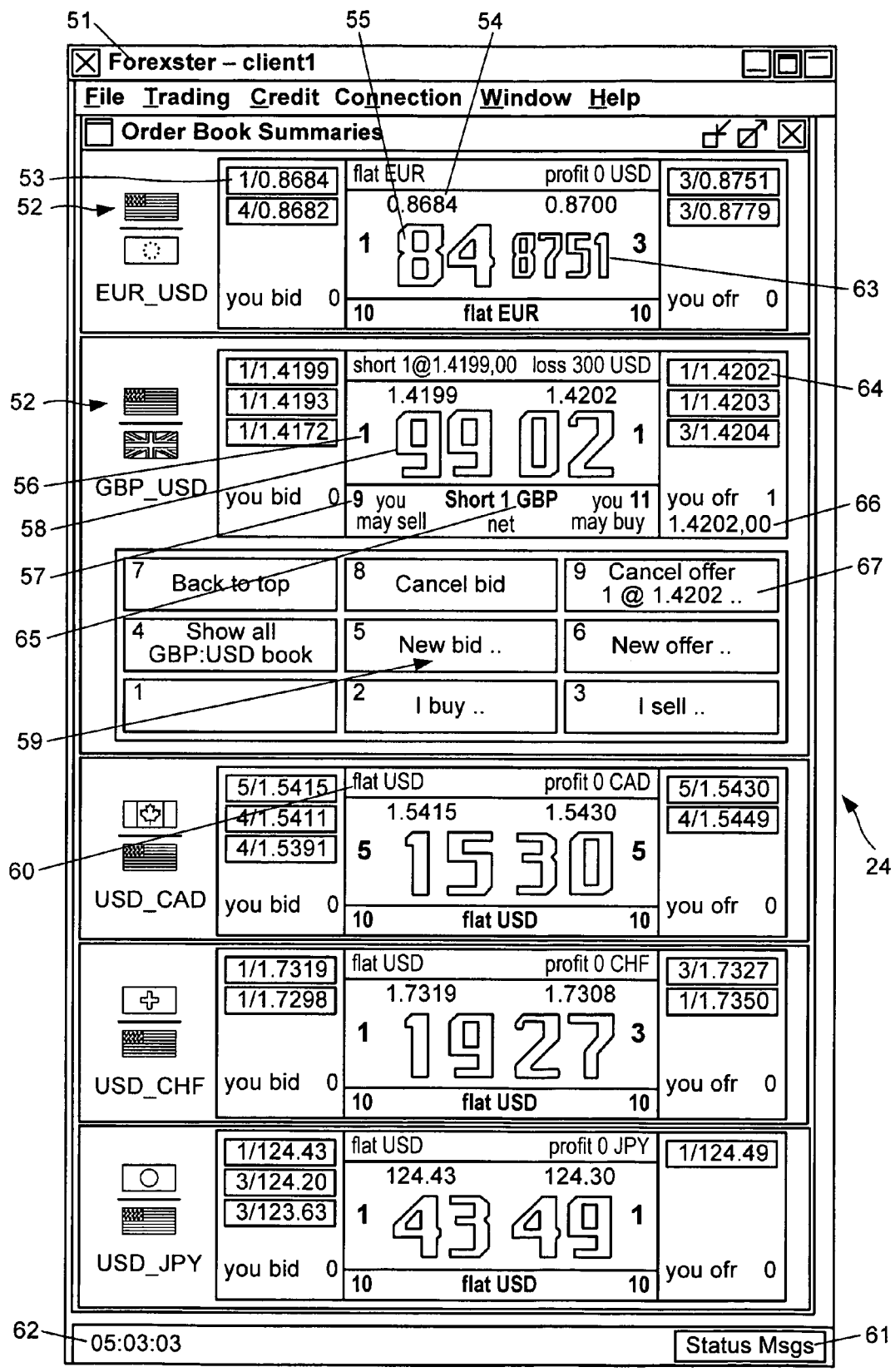
FIG. 13 illustrates a custom limit order book overview window 24 (multiple traded instruments).

FIG. 13 illustrates the main custom limit order book screen 24. Field 51 specifies the current account. Field 52 is a summary of the custom limit order book for each permissioned traded instrument. In this sample, where the instruments are pairs of currencies, the traded instruments are identified by icons representing the flags of the countries issuing the currencies. There are five fields 52 illustrated, representing five permissioned instruments. The second field 52 from the top (Great Britain pounds for U.S. dollars) is exploded, indicating the traded instrument currently activated by agent 2.

Field 53 displays the top (best) orders from the point of view of the agent 2. Field 54 displays the best bid price for any agent 2 coupled to the network 6,7. Field 55 displays the last two digits ("84") of the best available bid price. Field 56 displays the size at the best bid price. Field 57 displays agent 2's available liquidity for additional selling. Field 58 provides agent 2 with a mouse-clickable area (the big figure) enabling the agent 2 to jump to the buy or sell dialog screen 30 or 31, with amounts already filled in. Field 59 is a mouse-clickable numeric keypad allowing the agent 2 to create and cancel orders. Field 60 gives balance sheet values showing live valuations at market price and the profit that was banked by agent 2 for a certain period of time, such as the current day. Field 61 is a pop-up console allowing for the display of application messages, connection failure/retry messages, and broadcast messages from central computer 1. Field 62 displays the time since the agent 2 has logged in to computer 1. Field 63 displays the best available offer; in this case, four digits of the available offer are used to warn agent 2 that his best available offer is far from the overall best, due to a credit bottleneck. Field 64 shows this agent's orders in red. Field 65 shows this agent's current net position in the instrument being traded. Field 66 shows a summary of this agent's offers. Field 67 is a mouse-clickable area (tab 9) enabling the agent 2 to quickly cancel the top offer.

Figure 14:
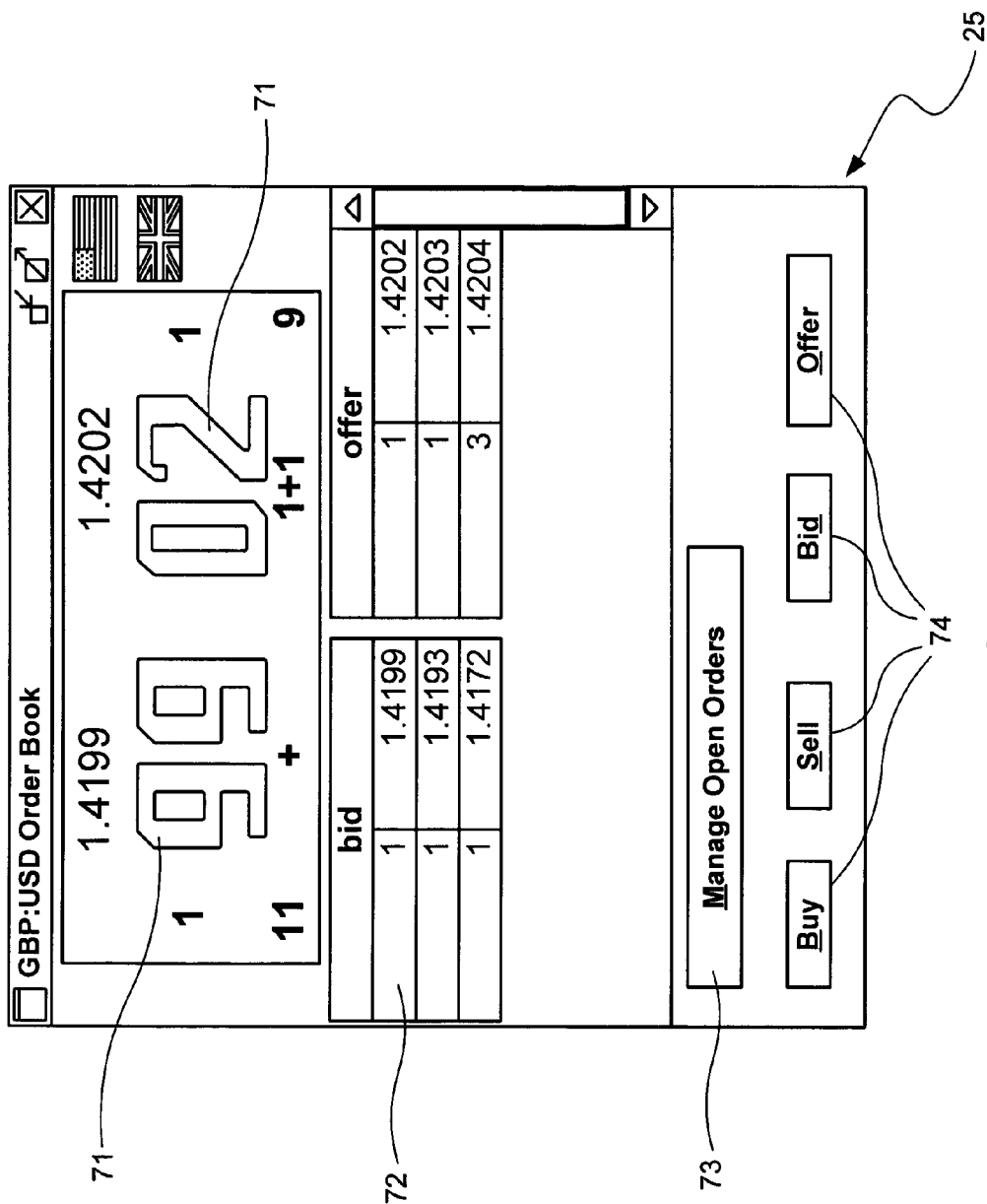
FIG. 14 illustrates a custom limit order book window 25 (single traded instrument).
Figure 17:
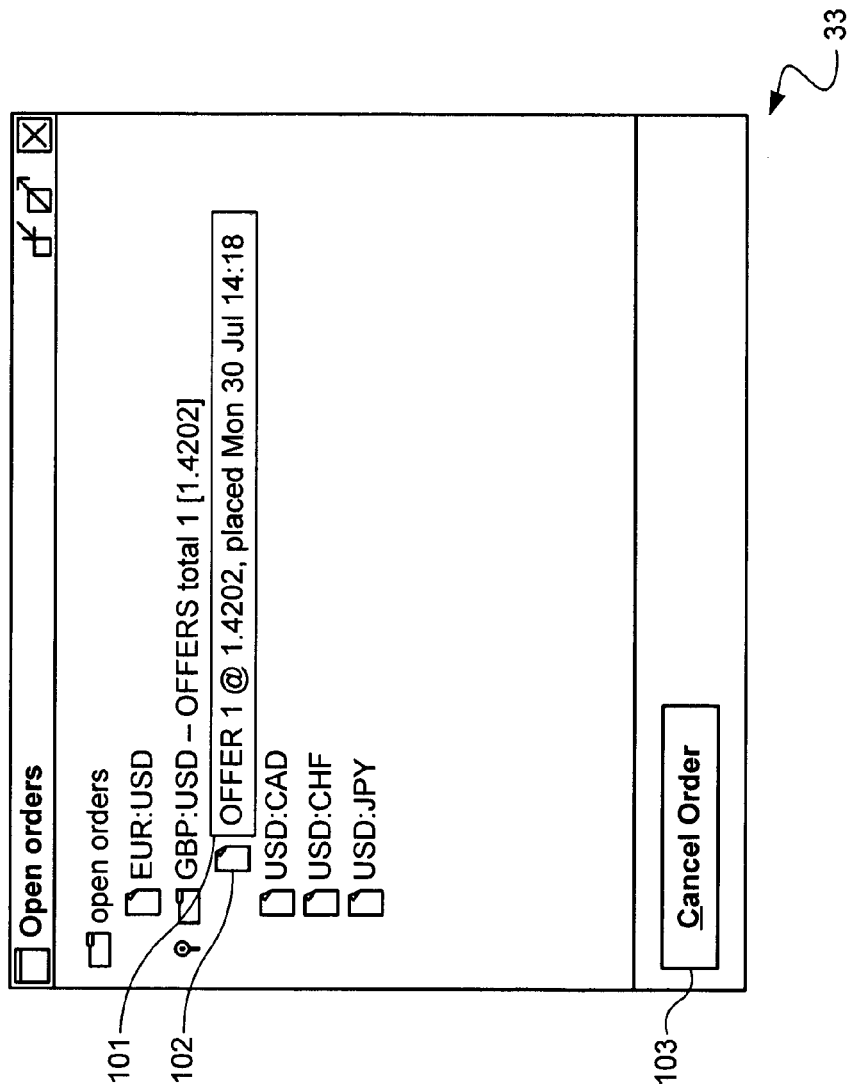
FIG. 17 illustrates an open order overview and management window 33.

FIG. 14 illustrates a custom limit order book depth window 25. There are N of these windows 25 for each instrument, where N is any preselected positive integer. Typically, N is equal to five. The N windows 25 display the N best bids and offers in order of price, and within price, in order of date and time, with the oldest presented first. Field 71 shows bid and offer information, with the last two digits of the bid and offer ("99" and "02", respectively) displayed in large numerals for readability. Field 72 shows visible (to that agent 2) bids and offers truncated by current credit availability, individually or aggregated by price (configurable). Bids and offers from this agent's account are shown in pink. Field 73 is a mouse-clickable field allowing agent 2 to navigate to screen 33 (FIG. 17). Field 74 is a set of four mouse-clickable areas enabling agent 2 to open buy, sell, bid, and offer dialog boxes (30, 31, 28, and 29, respectively), with price and size information pre-loaded from the current market.

FIG. 15 illustrates net exposure monitor 35. Each entry 81 gives the current exposure for each account, broken down by traded instrument. Field 82 ("min" and "max") shows asymmetric net position limits on a per-instrument basis. Field 83 ("current") shows a real-time update of net position. Field 84 shows a graphical representation of net position.

FIG. 16 illustrates balance sheet window 36. Field 91 shows payables and receivables, valued using the current market price. Total net position and net position for each counterparty 2 are given. Field 91 is organized as a tree hierarchy, and allows navigation to individual balance sheet transfers. Field 94 shows underlying flows; they have been sent to the agent's computer in an encrypted form, and are decrypted at the agent's computer. The decryption can be done automatically, as long as the agent 2 is logged in to the network 6,7. In field 94, one line represents each trade this agent 2 has made, or each trade for which this agent 2 was an intermediary 5. All values are live. This currency-based balance sheet 36 is capable of handling triangular instrument swaps.

FIG. 17 illustrates the open order overview and management window 33. Field 101 shows orders (bids and offers) currently placed by that agent summarized by traded instrument. Field 102 shows individual orders. Field 103 is a mouse-clickable area enabling the agent 2 to remove the order from the agent's custom limit order book 24,25. All values are updated immediately if their value has changed. In screen 33, an update procedure can be implemented in which the first offer is not cancelled until a new offer is posted. This is sometimes referred to as OCO (one cancels the other). In any event, it is never possible for an agent 2 to cancel an order after it has been taken by a counterparty 2.

Figure 18:
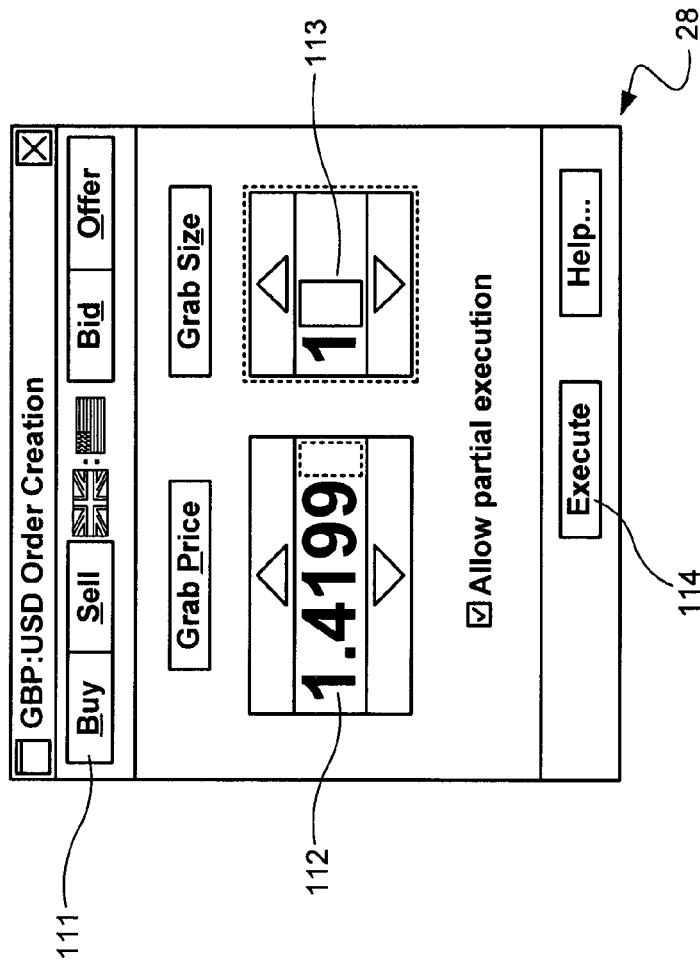
FIG. 18 illustrates a bid creation dialog box 28.

FIG. 18 illustrates bid creation dialog box 28. Field 111 is a group of icons, typically in various colors to provide visual context to reduce errors. Note that the word "Bid" is highlighted. Field 112 comprises three mouse-clickable areas allowing for quick up or down adjustment of price and direct entry of price, respectively, with initial value taken from the current market. Field 113 comprises three mouse-clickable areas allowing for quick up or down adjustment of size, and direct entry of size, with initial value configurable based upon the desires of the particular agent 2. Field 114 is a mouse-clickable area allowing the agent 2 to submit the bid, and has an optional confirmation dialog box associated therewith. An agent 2 can post his bid for just a short period of time and then withdraw it. He 2 can post multiple bids at multiple prices. When a counterparty 2 takes part or all of his bid, computer 1 recalculates the trading limits. Agent 2 can make his bid limited to "only if it is available now" or as an offer to buy.

Figure 19:
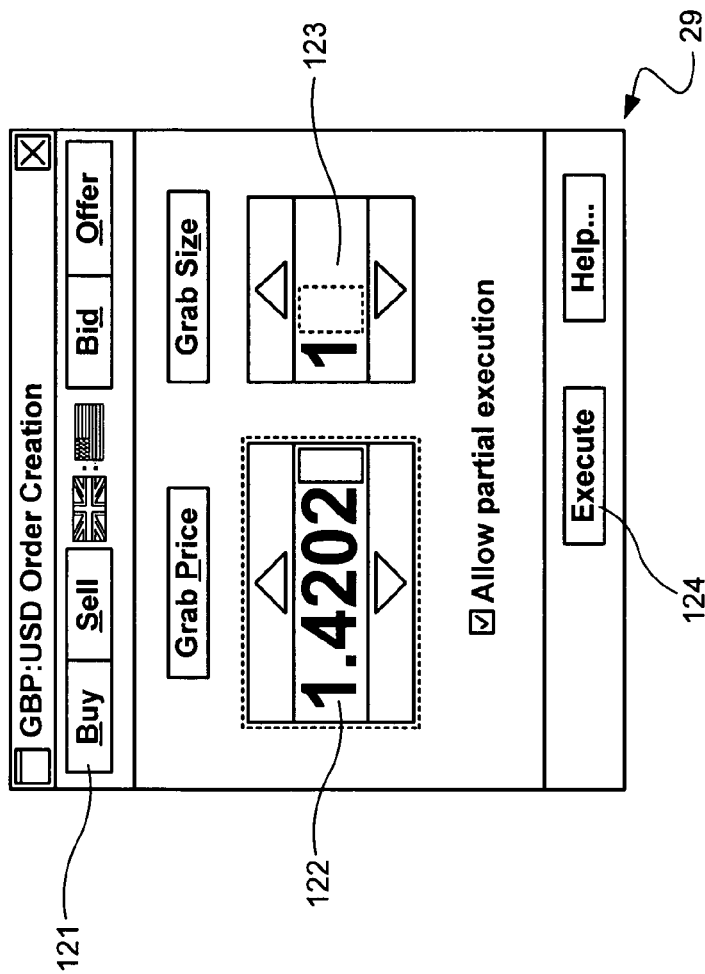
FIG. 19 illustrates an offer creation dialog box 29.

FIG. 19 illustrates offer creation dialog box 29. Field 121 comprises a set of icons, typically colored to provide visual context to reduce errors. Note that the word "Offer" is highlighted. Field 122 comprises three mouse-clickable areas allowing agent 2 to quickly achieve up or down adjustment of price and direct entry of price, with initial value taken from the current market. Field 123 comprises three mouse-clickable areas providing a quick means for agent 2 to achieve up or down adjustment of size and direct entry of size, with initial value configurable on a per user 2 basis. Field 124 is a mouse-clickable area allowing agent 2 to post the offer, and has an optional confirmation dialog box associated therewith.

Figure 20:
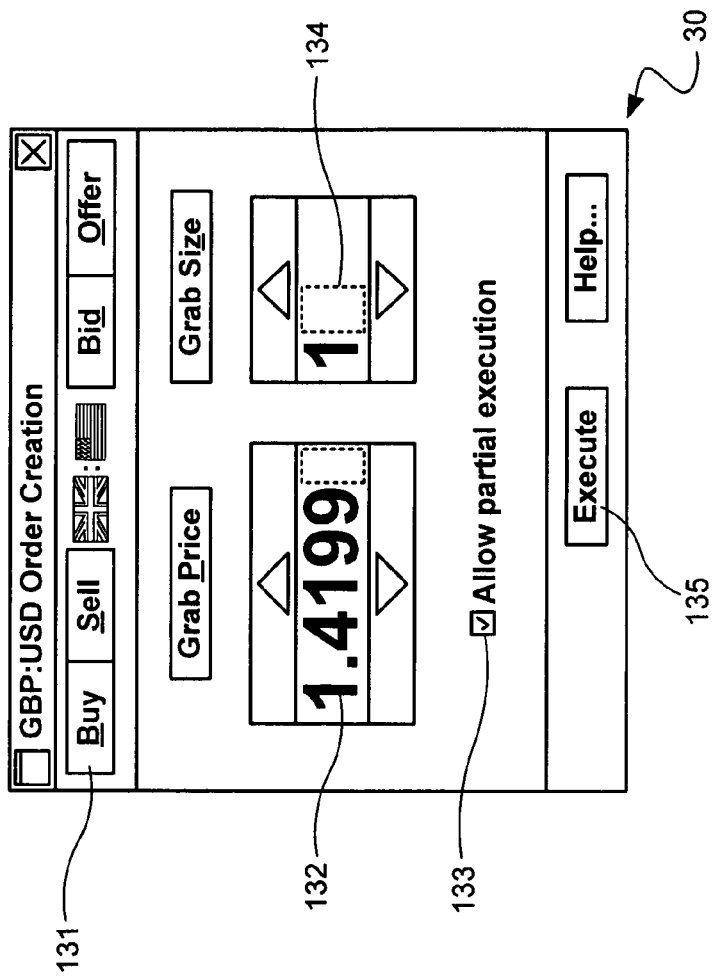
FIG. 20 illustrates a buy (immediate execution bid) dialog box 30.

FIG. 20 illustrates buy (immediate execution bid) dialog box 30. Field 131 comprises a set of icons, typically colored to provide visual context to reduce errors. Note that the word "Buy" is highlighted. Field 132 comprises three mouse-clickable areas, providing a quick means for up or down adjustment of price and direct entry of price, with initial value taken from the current market. Field 133 is a mouse-clickable button allowing for a partial execution of a trade. This allows agent 2 to buy either as much of the size as possible, or nothing if he cannot buy the entire size. Field 134 comprises three mouse-clickable areas providing a quick means for up or down adjustment of size and direct entry of size, with initial value configurable on a per user 2 basis. Field 135 is a mouse-clickable area allowing agent 2 to execute the buy, and has an optional confirmation dialog box associated therewith.

Figure 21:
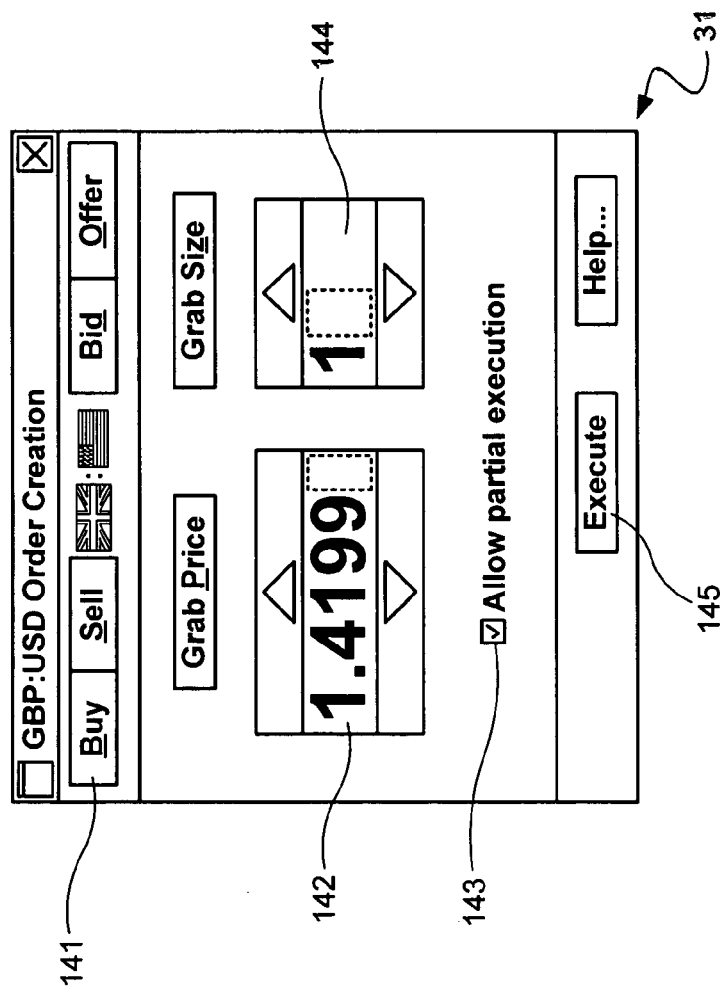
FIG. 21 illustrates a sell (immediate execution offer) dialog box 31.

FIG. 21 illustrates sell (immediate execution offer) dialog box 31. Field 141 is a set of icons, typically colored to provide visual context to reduce errors. Note that the word "Sell" is highlighted. Field 142 comprises three mouse-clickable areas providing a quick means for agent 2 to achieve up or down adjustment of price and direct entry of price, with initial value taken from the current market. Field 143 is a mouse-clickable area allowing partial execution. This allows agent 2 the choice of the sell being either to fill as much of the size as possible, or to not sell if he 2 cannot sell the entire size. Field 144 comprises three mouse-clickable areas providing for a quick means for up or down adjustment of size and direct entry of size, with initial value configurable on a per user 2 basis. Field 145 is a mouse-clickable area allowing the sell to be executed, and has an optional confirmation dialog box associated therewith.

Figure 22:
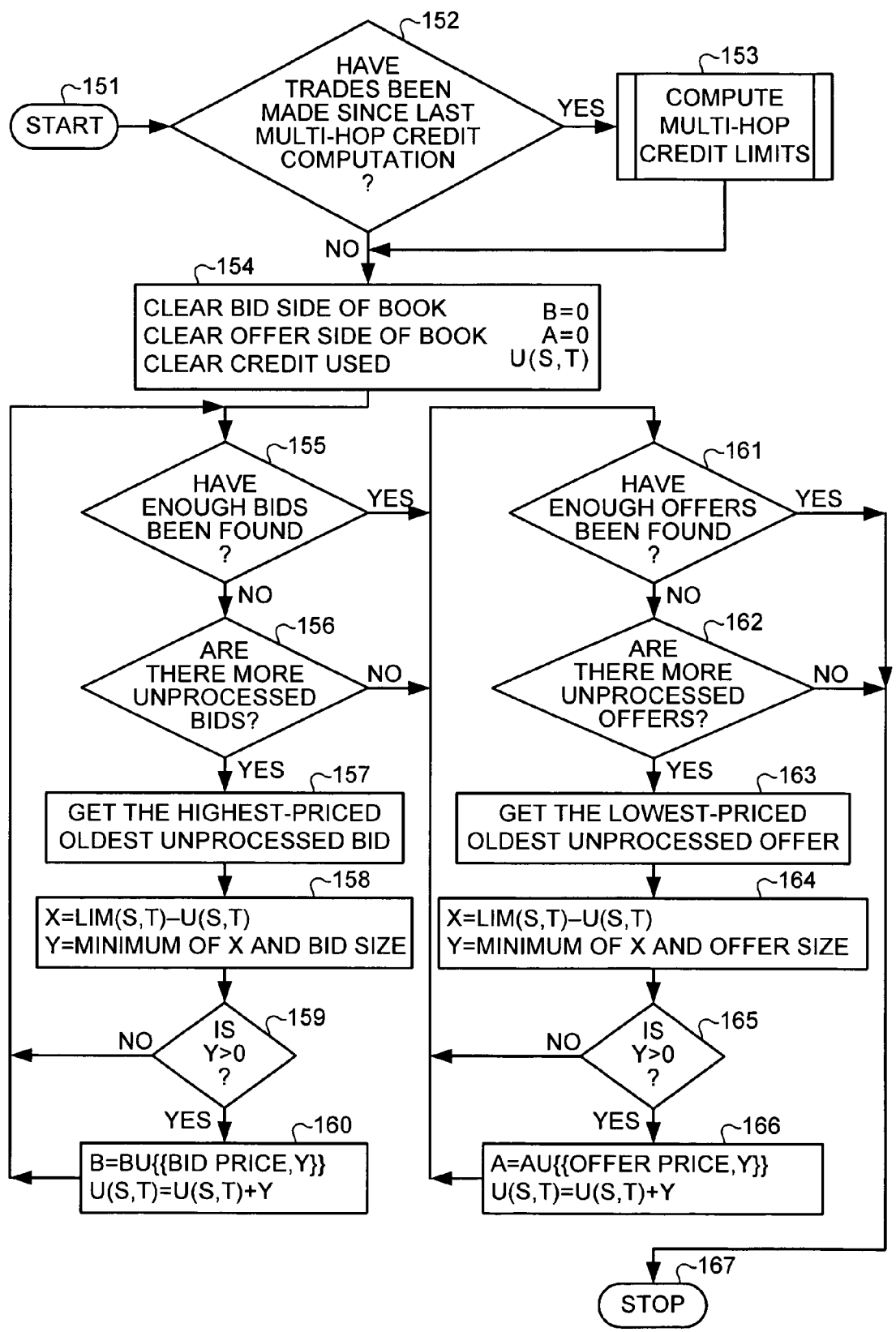
FIG. 22 is a flow diagram illustrating the computation of a custom limit order book 24,25.

FIG. 22 is a flow diagram illustrating the method steps by which computer 1 computes a custom limit order book 24,25 for a single agent 2 for a single traded instrument. Even intermediate agents 5 get a custom limit order book 24, 25. For the left hand side of FIG. 22, source S is that node 2 for which this custom limit order book is being prepared; and sink T is that node 2 that has posted the bid. For the right hand side of FIG. 22, source S is that node 2 that posted the offer; and sink T is that node 2 for which this custom limit order book is being prepared. "Source" and "sink" are standard network terminologies; see, e.g., the Ahuja reference previously cited. These concepts are used internally by computer 1, but are not disclosed to all agents 2 for reasons of preserving the desired anonymity. For example, the actual poster 2 of the offer does not appear on the screen of the counterparty 2.

Figure 23:
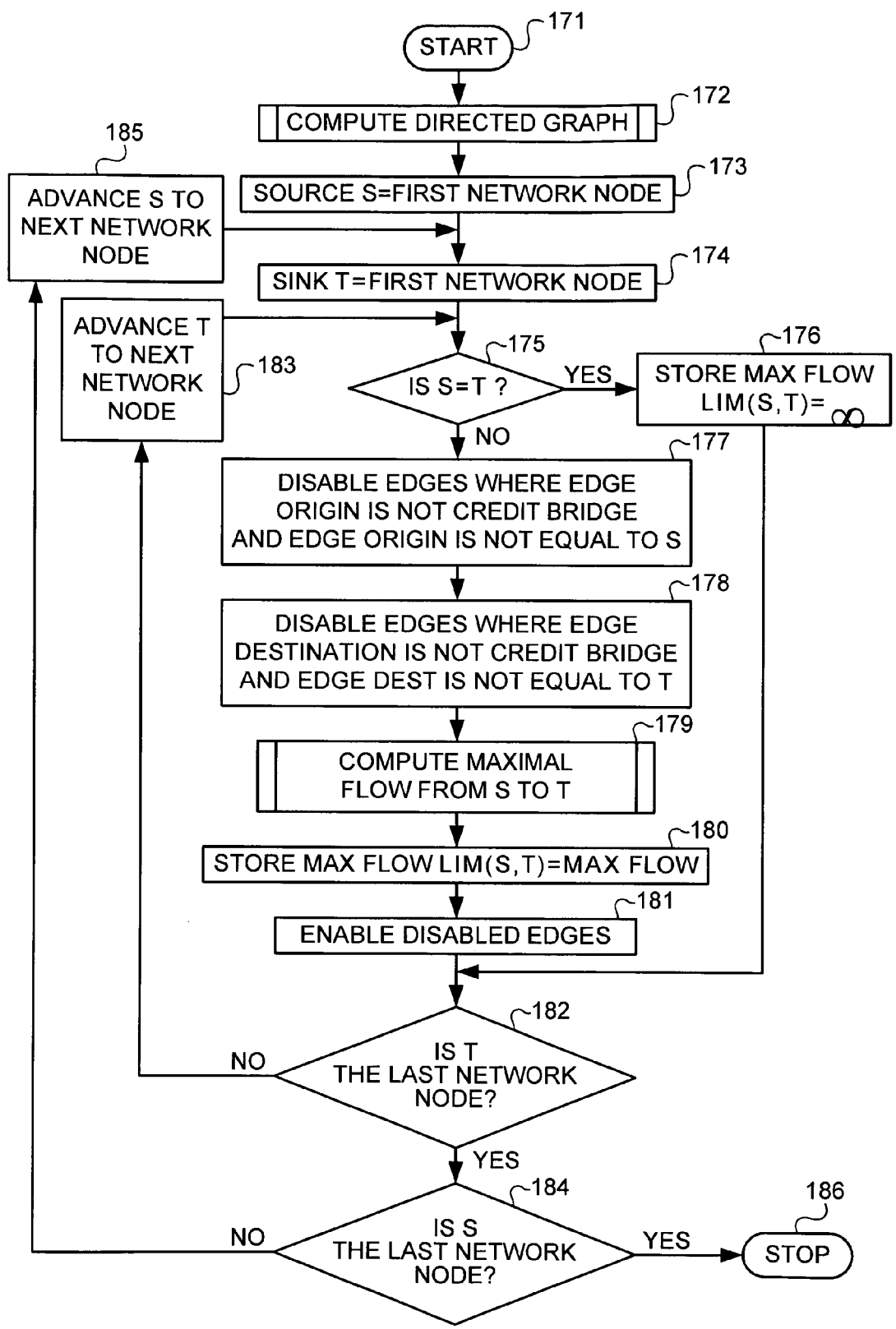
FIG. 23 is a flow diagram illustrating the computation of multi-hop flow limits for a single traded instrument among all accounts.

The method starts at step 151. In step 152, computer 1 asks whether there have been any trades made since the last multi-hop credit computation. This is meant to avoid unnecessary computation. If the answer to the question is "yes", then step 153 is executed. At step 153, multi-hop credit limits are computed, as illustrated in FIG. 23. If the answer to the question raised in step 152 is "no", step 154 is executed. At step 154, the bid side of the book is cleared, i.e., variable B becomes the null set; the offer side of the book is cleared, i.e., variable A becomes the null set; and the credit used (U as a function of S and T) is cleared. In this context, "used" applies only for this particular custom limit order book 24,25 for this particular agent 2. Step 155 is then executed, where it is asked whether enough bids have been found. "Enough" is a pre-established limit, e.g., five, and corresponds to N as discussed above in conjunction with custom limit order book detail window 25. N may be infinity, in which case the method always proceeds from step 155 to step 156. If enough bids have been found, the method proceeds to step 161. If enough bids have not been found, the method proceeds to step 156, where it is asked whether there are more unprocessed bids, i.e., if the number of bids that have been processed is less that the pre-established limit. If the answer is "no", step 161 is executed; otherwise, the method proceeds to step 157, where the highest priced oldest unprocessed bid is fetched. The hierarchy is according to highest bid. If there is a tie as to two or more highest bids, then the bids are ordered by time. It is forced that there not be a time-tie at this point; time collisions have already been resolved by locking using sequence numbers.

Step 158 is then executed. X is defined as the flow limit (trading limit) between S and T minus the credit U between S and T that has already been used up. Y is then set to be the minimum of X and the bid size. In other words, Y is what we have to work with. Step 159 is executed, where it is asked whether Y is greater than 0. If not, the method cycles back to step 155. If "yes", step 160 is executed. In step 160, the set of bids B is augmented by the current bid we are working with from step 157. Also in step 160, the credit used U is augmented by Y.

At step 161, it is asked whether enough offers have been found. Again, "enough" is a pre-established limit e.g., five, corresponding to N as before. If the answer to this is "yes", the method stops at step 167. If the answer is "no", step 162 is executed. At step 162, it is asked whether there are more unprocessed offers. If not, the method ends at step 167. If "yes", step 163 is executed, where the lowest priced, oldest unprocessed offer is fetched. Then, step 164 is executed, where X is set to be the trading limit between S and T minus the unused credit U. Y is then set to be the minimum of X and the offer size. Step 165 is then executed. At step 165, it is asked whether Y is greater than 0. If not, control is passed back to step 161. If "yes", step 166 is executed, where the current offer price being worked on from box 163 is added to the set of offers A; and the credit used U is augmented by Y. Control then passes back to step 161.

FIG. 23 illustrates how computer 1 calculates multi-hop trading limits for each pair of agents 2 for a single traded instrument L:Q, i.e., how computer 1 performs step 153 on FIG. 22. This is akin to compiling a table like Table 1 shown above. This procedure starts at step 171. At step 172, a directed graph is computed for the traded instrument L:Q, in which the arrow corresponds to the direction of flow of the lot instrument L. Individual trading limits are introduced at this point. Step 172 is the subject of FIG. 24. At step 173, an arbitrary network node 2 is selected to be the first node worked upon by the process and is given the designation source S. At step 174, sink T is also set to be said first network node 2. At step 175, it is asked whether S is equal to T. If so (which, of course, is the case initially), the procedure moves to step 176, where the maximum flow limit between S and T is set to be infinity. This is simply another way of saying that an agent 2 is allowed to have an infinite flow with himself 2. Then, at step 182, it is asked whether T is the last network node that needs to be processed. If "yes", control is passed to step 184; if "no", control is passed to step 183, where T is advanced to the next network node; and control is passed back to step 175. "Next" can be anything, because the order of processing is of no import.

If S is found not to be equal to T at step 175, control is passed to step 177, which disables edges 3 where the edge origin 2 is not a credit bridge 5 and the edge origin 2 is not equal to S. An edge 3 may be disabled internally by adjusting its maximum capacity to 0 or by removing it from the set of edges 3 that comprise the graph. The "edge origin" is that node 2 from which the lot instrument L flows. Steps 177 and 178 eliminate agents 2 who have not agreed in advance to be intermediaries, i.e., "credit bridges". An intermediary (credit bridge) is an agent 5 that allows two other agents 2 to do back-to-back trades through the intermediary agent 5. Step 178 disables edges 3 where the edge destination 2 is not a credit bridge 5 and the edge destination 2 is not equal to T. An "edge destination" is a node 2 that receives the flow of the lot instrument L.

At step 179, the maximal flow from S to T is computed using a maximal flow algorithm such as one of the algorithms disclosed in Chapter 7 of the Ahuja reference previously cited. At step 180, the multi-hop credit limit between S and T, LIM(S,T), is set to be equal to the maximum flow obtained from step 179. At step 181, the edges 3 that were disabled in steps 177 and 178 are re-enabled. Step 184 asks whether S is the last network node to be processed. If "yes", the procedure concludes at step 186. If "no", the process moves to step 185, where S is advanced to the next network node. Again, "next" is arbitrary and simply refers to any other unprocessed node 2. After step 185, the method re-executes steps 174.

Figure 24:
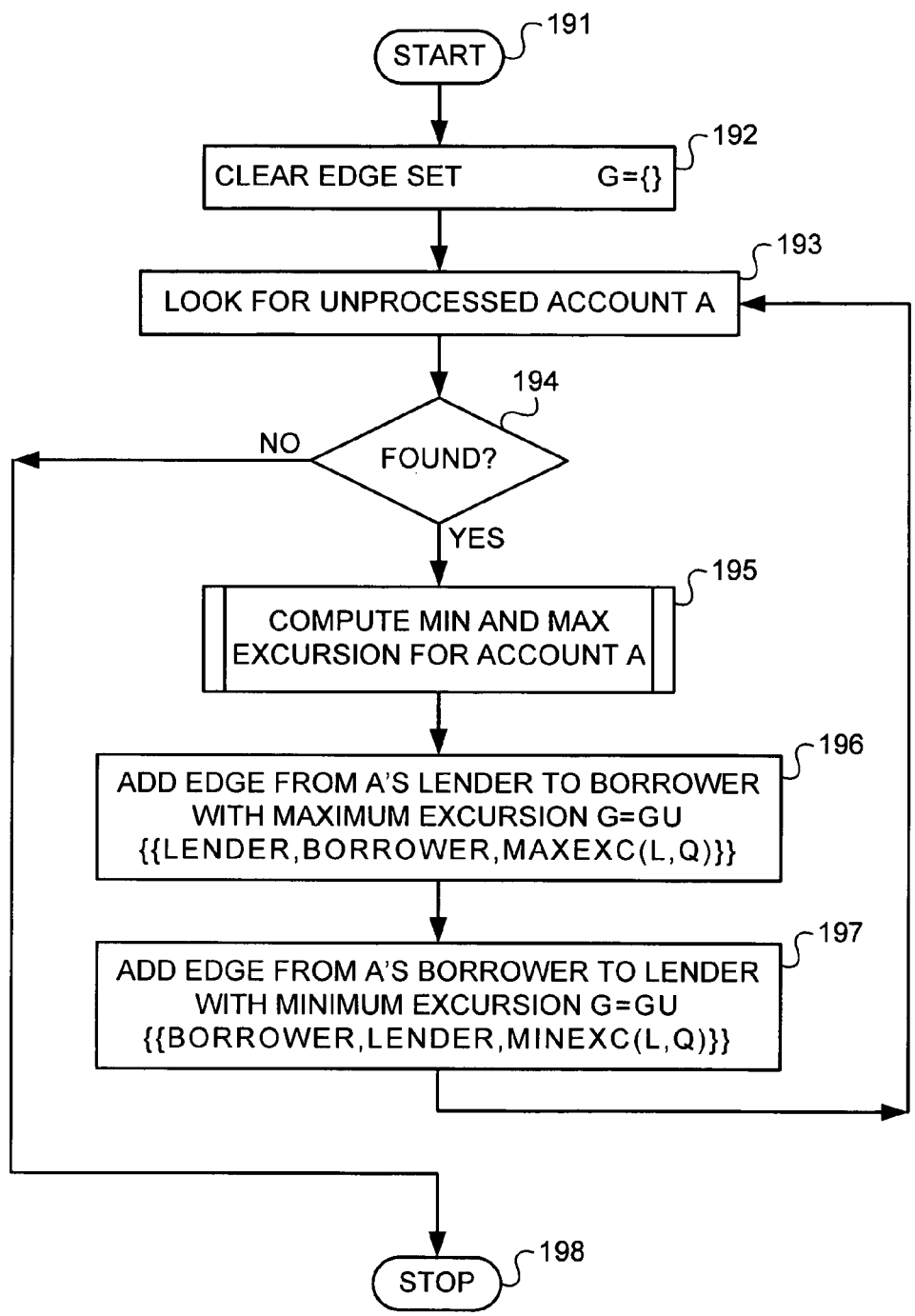
FIG. 24 is a flow diagram illustrating computation of a directed graph of single-hop flow limits for a single traded instrument among all accounts.

FIG. 24 illustrates how computer 1 calculates a directed graph for the traded instrument L:Q, i.e., how computer 1 performs step 172 of FIG. 23. This is akin to producing a graph such as that shown in FIG. 5, with arrows as in FIG. 10. The operation commences at step 191. At step 192, the edge 3 set G is nulled out. At step 193, computer 1 searches its records for any account A that it has not yet processed. The order of selection of unprocessed accounts is irrelevant. Account A is any pre-existing trading (credit) relationship between two neighboring agents 2 that has been previously conveyed to the operator of computer 1 in writing in conjunction with these agents 2 subscribing to the trading system operated by the operator of computer 1.

Step 194 asks whether there is any such unprocessed account A. If "not", this process stops at step 198. If there 231 is an unprocessed account A, the process executes step 195, 241 where the minimum and maximum excursions for account A are calculated. Step 195 is the subject of FIG. 25. These minimum and maximum excursions are defined in terms of the lot instrument L, and are calculated from one or more of eight possible ways of specifying input credit limits. The maximum and minimum excursions are excursions from current position. The input credit limits are specified as part of each account A. In step 196, the set of edges G is augmented with an edge 3 from A's lender 2 to A's borrower 2, with the capacity of the edge 3 being set to the maximum excursion. L is the lot instrument and Q is the quoted instrument. In step 197, the set of edges G is augmented with an edge 3 from A's borrower 2 to A's lender 2, with the capacity of the edge 3 being set to the negative of the minimum excursion. The process then re-executes step 193.

Figure 25A:
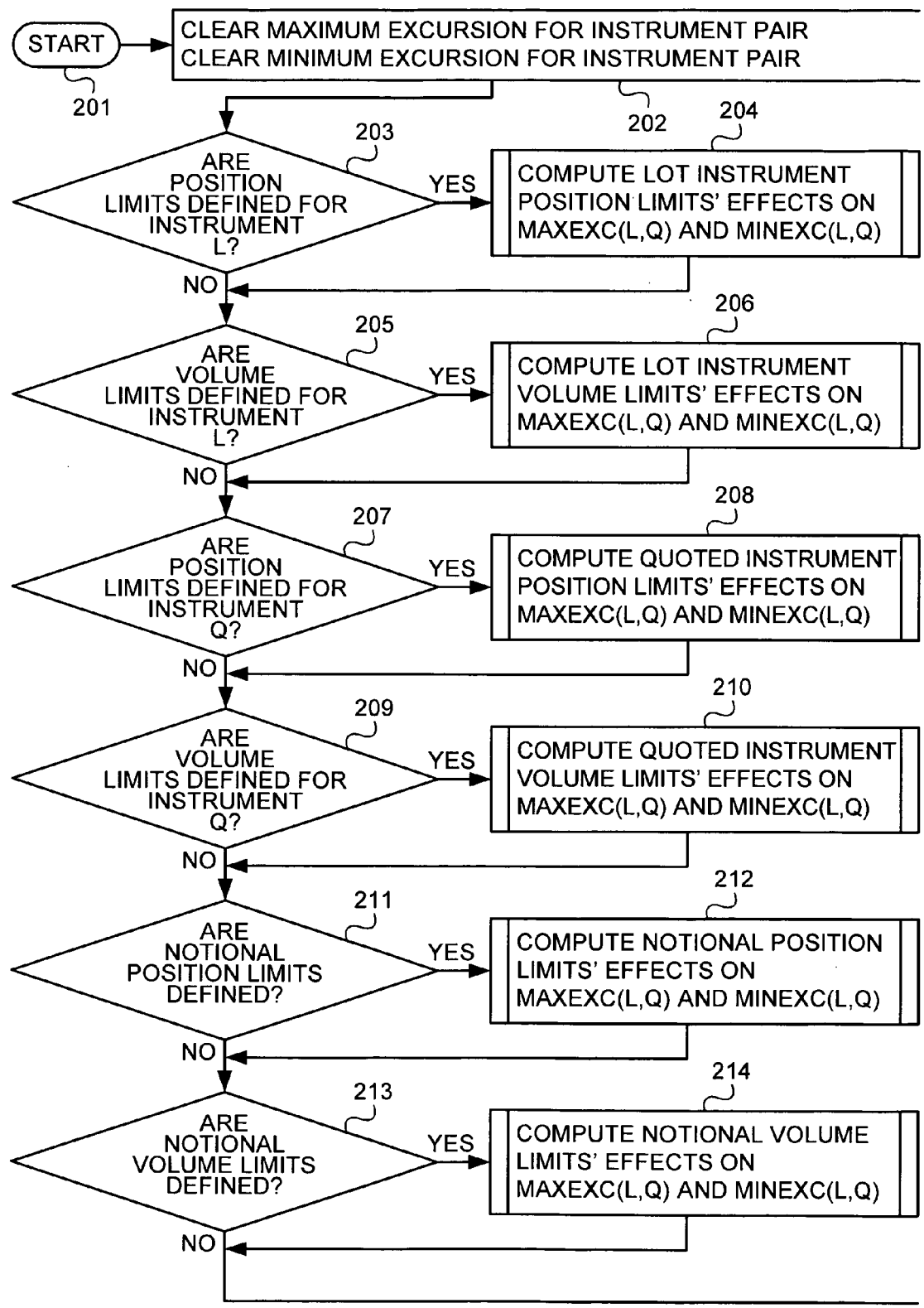
FIGS. 25A and 25B are a flow diagram illustrating computation of minimum and maximum excursions for a single account A and a single traded instrument.
Figure 25B:
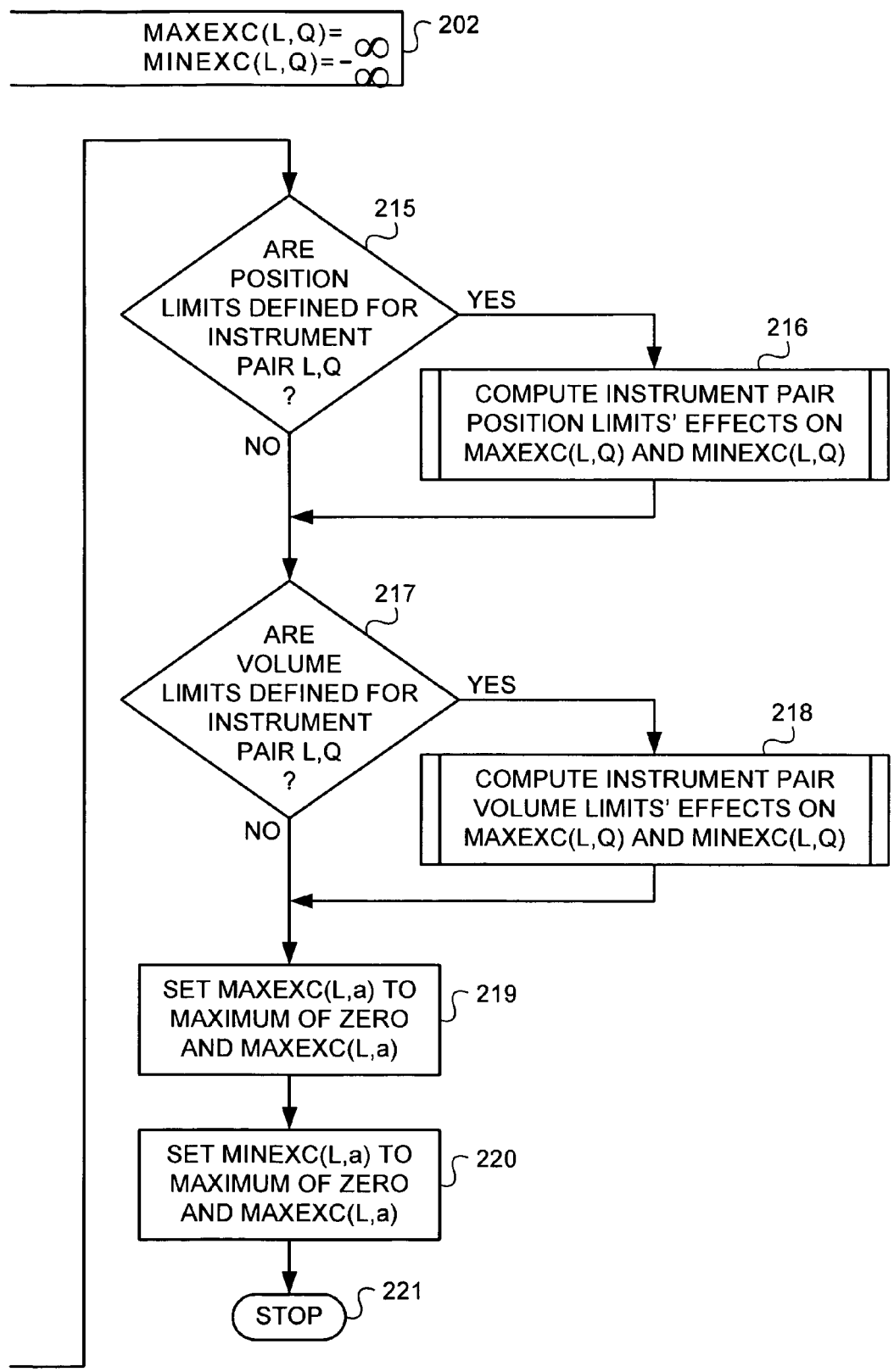

FIG. 25 shows how computer 1 calculates the minimum and maximum excursions for a single account A and a single traded instrument L:Q, i.e., how computer 1 executes step 195 of FIG. 25. This computation takes into account up to eight different ways a guaranteeing agent 5 may specify input credit limits in an account A. The operation commences at step 201. At step 202, the maximum excursion is set to be infinity and the minimum excursion is set to be minus infinity, because at this point there are no trading limits.

Step 203 asks whether position limits have been defined for the lot instrument. If yes, step 204 is executed. At step 204, the lot instrument position limits' effects on the maximum and minimum excursions are calculated. This is the subject of FIG. 26. At step 205, it is asked whether volume limits have been specified for the lot instrument. If so, step 206 is executed. At step 206, the lot limit volume limits' effects on the maximum and minimum excursions are calculated. This is the subject of FIG. 28. At step 207, it is asked whether position limits have been specified for the quoted instrument. If so, step 208 is executed. At step 208, the quoted instrument position limits' effects on the maximum and minimum excursions are calculated. This is the subject of FIG. 27. At step 209, it is asked whether volume limits have been specified for the quoted instrument. If so, step 210 is executed. At step 210, the quoted instrument volume limits' effects on the maximum and minimum excursions are calculated. This is the subject of FIG. 29. At step 211, it is asked whether notional position limits have been specified. If so, step 212 is executed. At step 212, the notional position limits' effects on the maximum and minimum excursions are calculated. This is the subject of FIG. 30. At step 213, it is asked whether notional volume limits have been specified. If so, step 214 is executed. At step 214, the notional volume limits' effects on the maximum and minimum excursions are calculated. This is the subject of FIG. 31. At step 215, it is asked whether position limits have been specified for the traded instrument L:Q. If so, step 216 is executed. At step 216, the traded instrument L:Q position limits' effects on the maximum and minimum excursions are calculated. This is the subject of FIG. 32. At step 217, it is asked whether volume limits have been specified for the traded instrument L:Q. If so, step 218 is executed. At step 218, the traded instrument L:Q volume limits' effects on the maximum and minimum excursions are calculated. This is the subject of FIG. 33.

Then step 219 is executed, where the maximum excursion is set to be equal to the maximum of 0 and the current value of the maximum excursion. This is done because we don't want to have a negative maximum excursion. At step 220, the minimum excursion is set to be the minimum of 0 and the current value of the minimum excursion. This is done because we do not want to have a positive minimum excursion. Then, the method ends at step 221.

It is important to note that the order of taking into account the effects of the eight types of specified input credit limits is irrelevant, because each of the eight can only constrict an excursion more, not expand it. Therefore, the ultimate limit is the most restrictive one. All of the eight trading limits described herein are recalculated after each trade affecting that limit.

As used herein, a "trading limit" is something calculated by computer 1, and a "credit limit" is something specified by a guaranteeing agent 5.

Conventional mathematical shortcuts can be used to speed the calculations without necessarily having to repeat all the method steps in all but the first time a particular method is executed. All of the steps of FIG. 25 get executed the first time a method shown in FIGS. 26 through 33 is executed.

Figure 26:
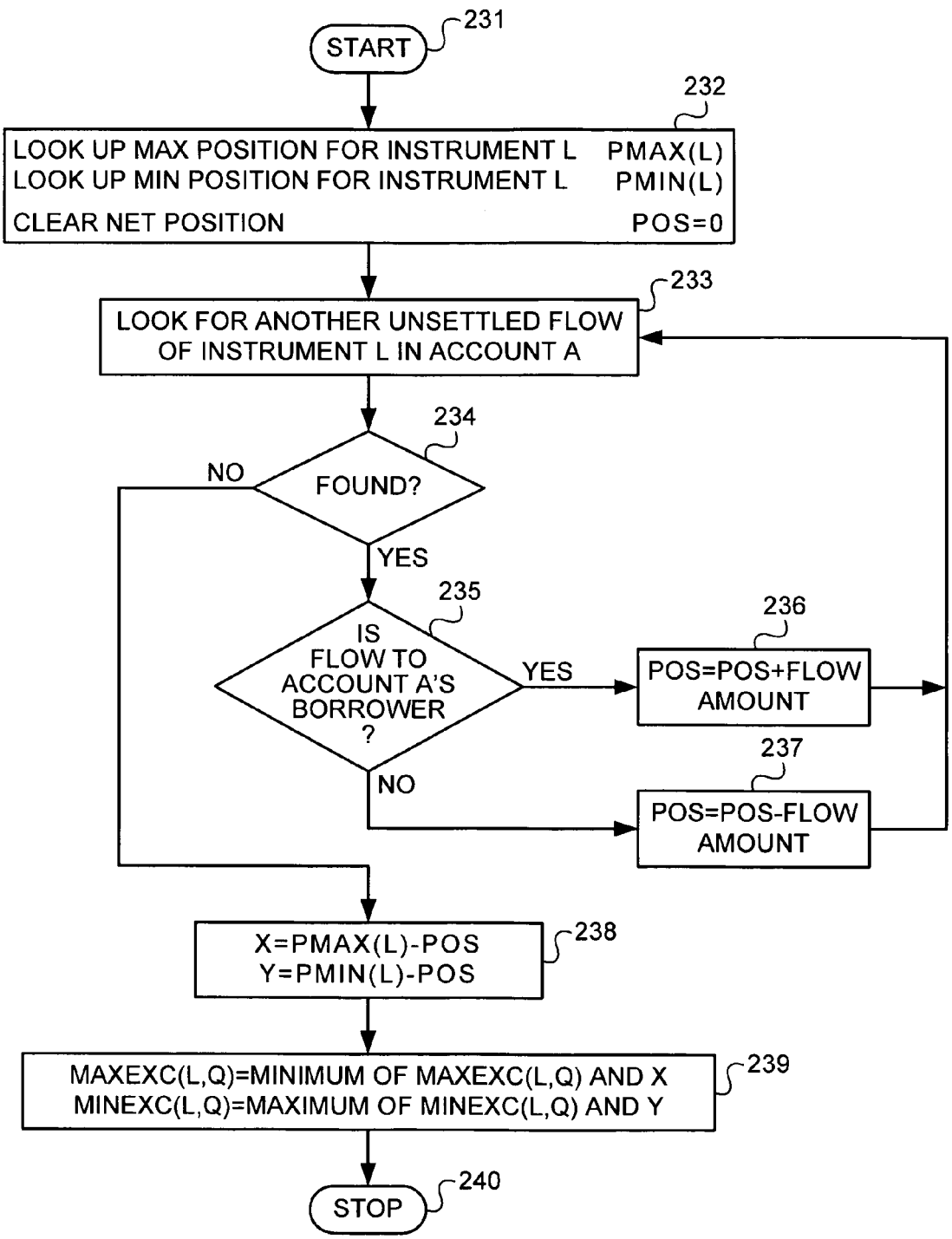
FIG. 26 is a flow diagram illustrating computation of a position limit for a lot instrument L.

FIG. 26 shows how computer 1 calculates the position limit for the lot instrument, i.e., how computer 1 performs step 204 of FIG. 25. A position limit is a net limit in the instrument being traded. The method starts at step 231. At step 232, computer 1 retrieves the specified input maximum position credit limit for instrument L, PMAX(L), and the specified input minimum position credit limit for instrument L, PMIN(L). Normally, PMIN(L) is the negative of PMAX(L), but that doesn't necessarily have to be true. Also in step 232, the net position, POS, is zeroed out.

In step 233, computer 1 looks for another unsettled flow of instrument L in account A. "Another" is arbitrary. At step 234, it is asked whether such another unsettled flow exists. If not, control passes to step 238. If the answer is "yes", step 235 is executed, wherein it is asked whether the flow is to account A's borrower 2. A "flow" is a transfer of a single instrument along a single edge 3. This is the same as asking whether the flow is to other than a guaranteeing agent 5, because the lender is the guaranteeing agent 5. If the answer is yes, step 236 is executed, during which POS is augmented by the flow amount, and control passes back to step 233. This inner loop 233–236 constitutes calculation of the net position, and is performed for each Q matching that L.

If the answer to the question posed in step 235 is "no", step 237 is executed, wherein POS is decremented by the flow amount, and control is passed back to step 233. At step 238, X is set to be equal to PMAX(L) minus POS, and Y is set equal to PMIN(L) minus POS. X is the maximum excursion from this flowchart and Y is the minimum excursion from this flowchart. At step 239, the maximum excursion for the traded instrument L:Q is set to be equal to the minimum of the current value of this maximum excursion and X; and the minimum excursion for the traded instrument L:Q is set to be equal to the maximum of the minimum of the current value of the minimum excursion and Y. In other words, the set of maximum and minimum excursions is updated based upon the results of this flowchart. The method ends at step 240.

Figure 27:
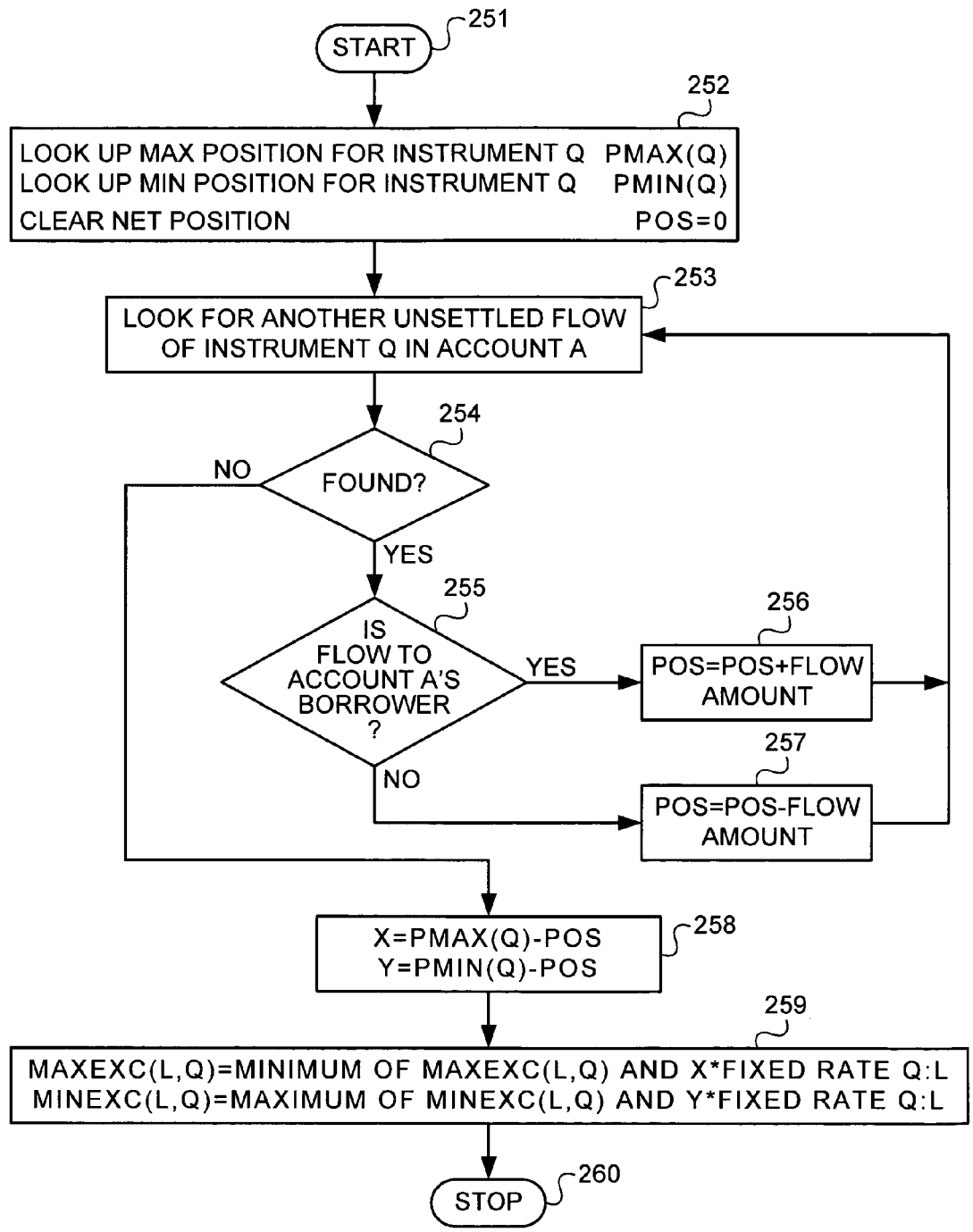
FIG. 27 is a flow diagram illustrating computation of a position limit for a quoted instrument Q.

FIG. 27 illustrates how computer 1 calculates the position limit for the quoted instrument, i.e., how computer 1 performs step 208 of FIG. 25. Other than the fact that Q is substituted for L, the method described in FIG. 27 is identical to that described in FIG. 26, with one exception: in step 259 (analogous to step 239 of FIG. 26), we convert from the quoted instrument to the lot instrument, because we want everything expressed in terms of the lot instrument once we get to the higher level flowchart (FIG. 25). Therefore, in step 259, X and Y are each multiplied by a "fixed rate Q:L" (exchange rate). This exchange rate is fixed for a certain period of time, e.g., one hour or one day, and may be different for different accounts at the same moment in time.

Figure 28:
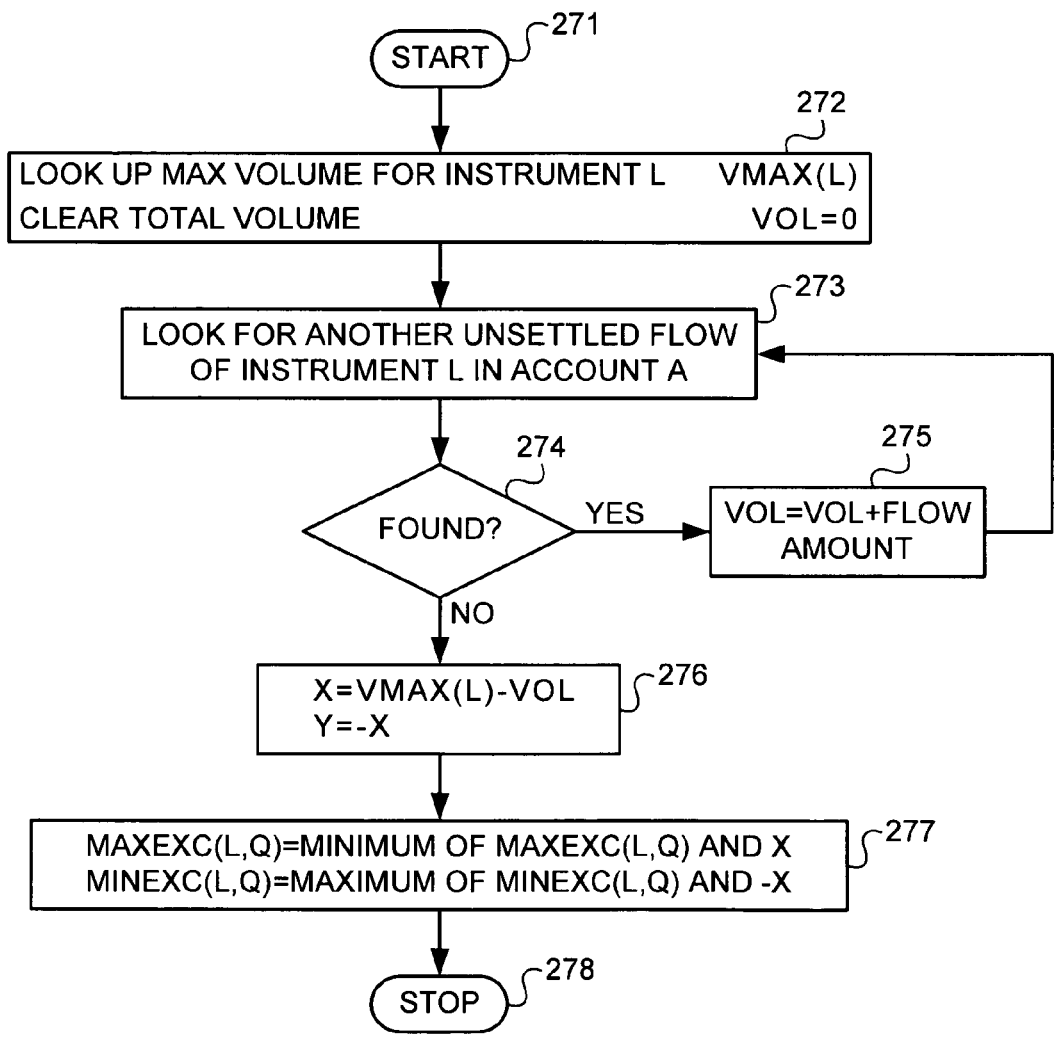
FIG. 28 is a flow diagram illustrating computation of a volume limit for a lot instrument L.

FIG. 28 illustrates how computer 1 calculates the volume limit for the lot instrument, i.e., how computer 1 performs step 206 of FIG. 25. A volume limit is a gross limit in the instrument being traded. The method starts at step 271. In step 272, computer 1 retrieves the specified input maximum permissible volume credit limit for instrument L, VMAX(L); and clears a variable field VOL representing total volume. In step 273, computer 1 looks for another unsettled flow of instrument L in account A. "Another" is arbitrary. At step 274, it is asked whether such another unsettled flow has been found. If "yes", at step 275, VOL is augmented with the flow amount. It doesn't matter whether the flow is in or out to a particular node 2; it counts towards the volume limit the same in each case.

Control is then passed back to step 273. If the answer posed in step 274 is "no", step 276 is executed, wherein X is set equal to VMAX(L) minus VOL, and Y is set equal to minus X, because of the definition of "volume". Again, X and Y are the partial limits as calculated by this particular flowchart. Then in step 277, the maximum excursion is set equal to the minimum of the previous value of the maximum excursion and X; in the minimum excursion is set equal to the maximum of the previous value of the minimum excursion and minus X. In other words, the overall excursions are updated based upon the results of this flowchart. The method then ends at step 278.

Figure 29:
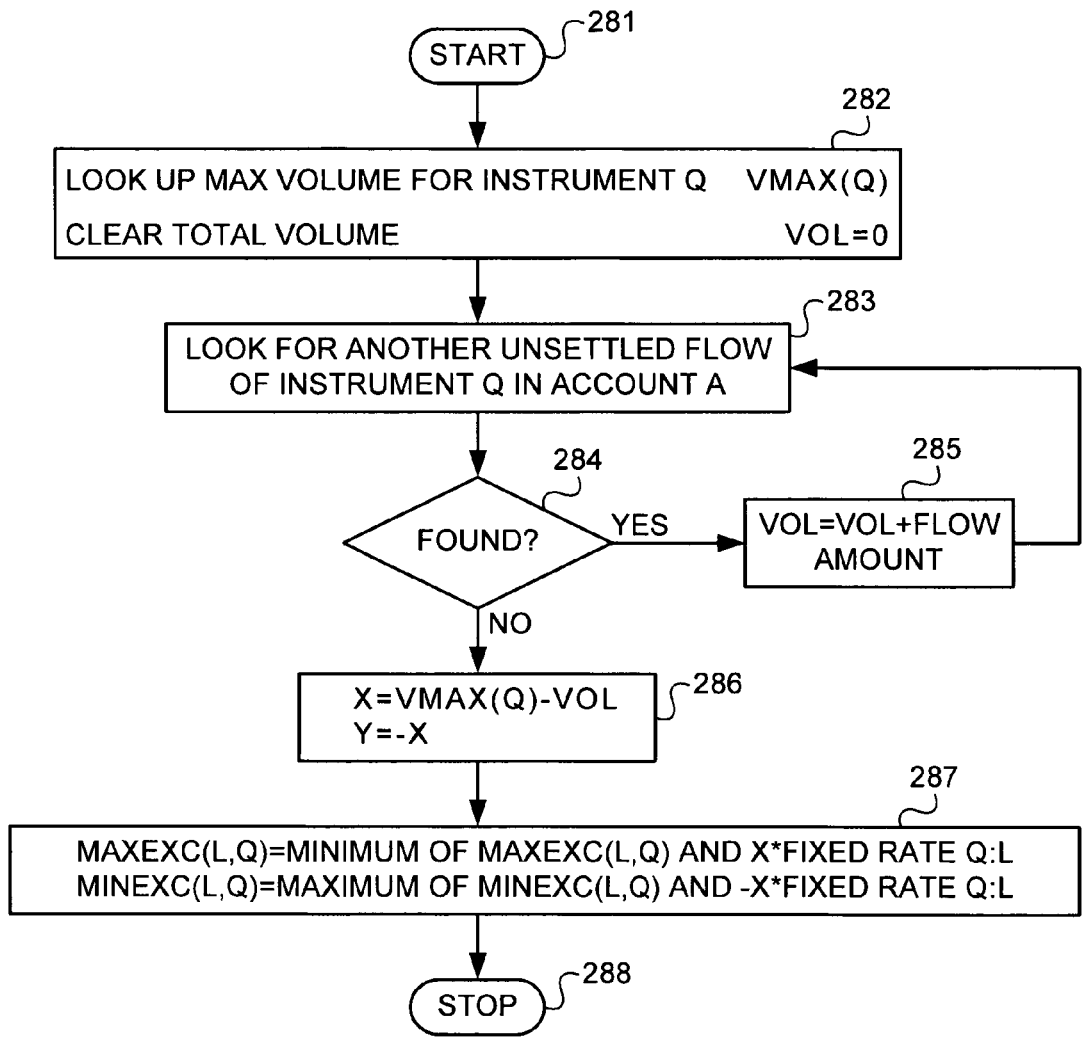
FIG. 29 is a flow diagram illustrating computation of a volume limit for a quoted instrument Q.

FIG. 29 illustrates how computer 1 calculates the volume limit for the quoted instrument, i.e., how computer 1 performs step 210 of FIG. 25. Other than the fact that Q is substituted for L, the method steps of FIG. 29 are identical to those of FIG. 28, with one exception: in step 287 (analogous to step 277 of FIG. 28), X and minus X are each multiplied by "fixed rate Q:L" for the same reason that this factor was introduced in FIG. 27.

Figure 30:
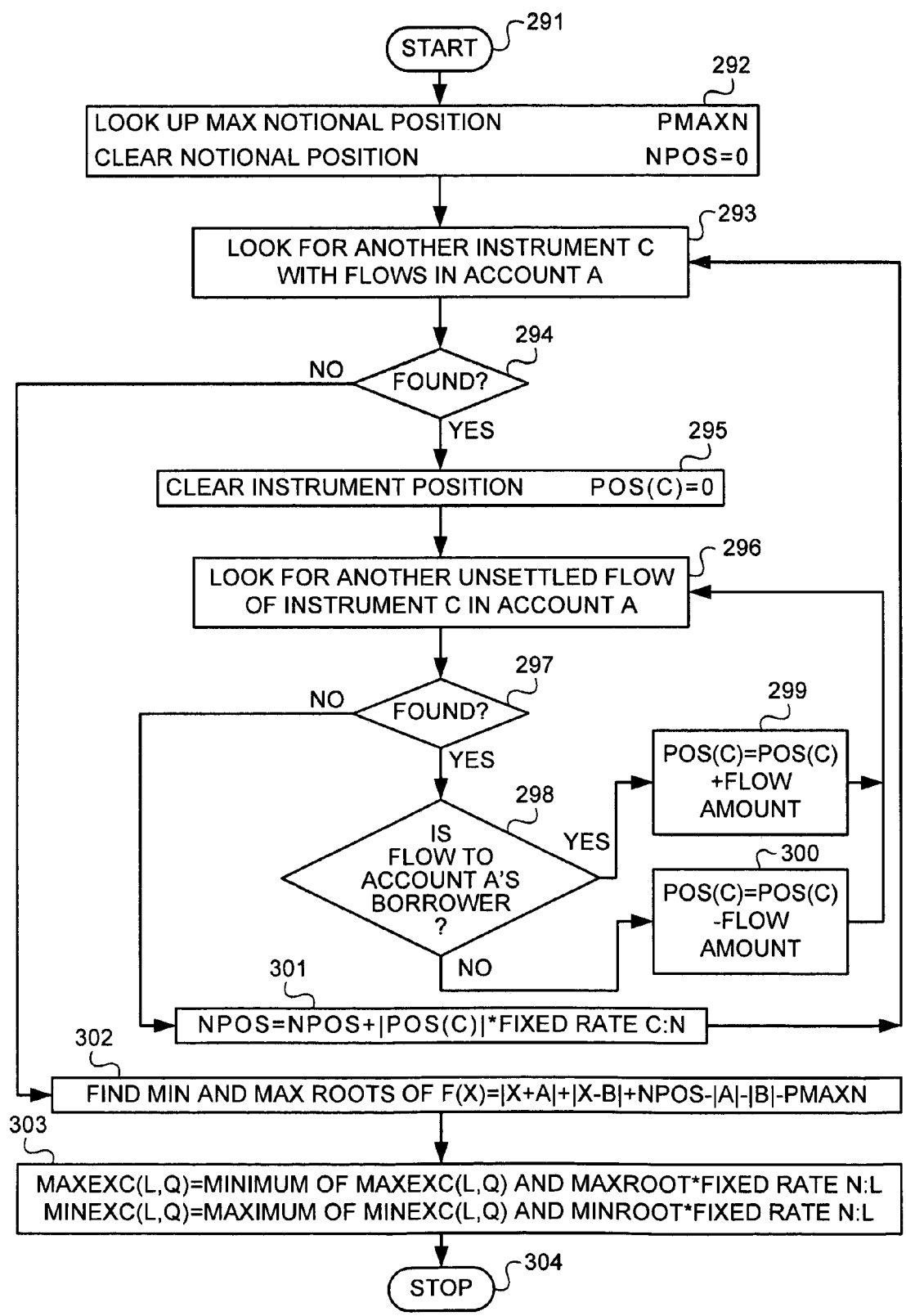
FIG. 30 is a flow diagram illustrating computation of a notional position limit.

FIG. 30 illustrates how computer 1 calculates the notional position limit, i.e., how computer 1 performs step 212 of FIG. 25. The notional position limit protects the guaranteeing agent 5 against rate excursions aggregated over the positions in all of the instruments. "Notional" means we are changing the notation; the concept implies that there is a conversion from one instrument to another, and that the conversion is done at a certain rate that has been agreed upon. The rate is set periodically, e.g., daily. This conversion from one instrument to another is used to convert all values into a single currency for the purpose of aggregation into a single value.

The method commences at step 291. At step 292, computer 1 retrieves the maximum notional position credit limit PMAXN, where N is the notional instrument, i.e, the instrument in which the limit is presented. In step 292, the notional position, NPOS, is also zeroed out. In step 293, computer 1 looks for another instrument C with flows in account A. C is an index designating the instrument for which we are executing the loop 293–301. The order of selecting the instruments is immaterial. Step 294 asks whether such another instrument C has been found. If not, control passes to step 302. If the answer is yes, step 295 is executed, wherein the instrument position, POS(C), is zeroed out. At step 296, computer 1 looks for another unsettled flow of instrument C in account A.

Step 297 asks whether such another unsettled flow has been found. If not, control passes to step 301. If the answer is "yes", step 298 is executed, where it is asked whether the flow is to account A's borrower 2. If "yes", POS(C) is augmented with the flow amount at step 299. If not, POS(C) is decremented by the flow amount at step 300. In either case, control is returned to step 296. Note that the inner loop 296–300 is analogous to the loops in FIGS. 26 and 27. At step 301, NPOS is augmented by the absolute value of POS(C) multiplied by "fixed rate C:N", which converts to the notional instrument. The absolute value of POS(C) is used, because a negative position presents the same risk to the guaranteeing agent 5 as a positive position.

Before we describe step 302, let us define A and B, as those terms are used in step 302. Note that "A" in step 302 is not the same as "account A". A is the position of L, POS(L), multiplied by "fixed rate L:N", which converts this position to the notional instrument. B is the position of Q, POS(Q), multiplied by "fixed rate Q:N", which converts this to the notional instrument. The positions of L and Q are as calculated in the above loop 294–301; if L and Q were not subject to these notional limits, then A and B would be 0.

In step 302, computer 1 finds the minimum and maximum roots of F(X), where F(X) is defined in step 302. The term "root" is that of conventional mathematical literature, i.e., a value of X that makes F(X) equal to 0. Let us define E to be equal to the absolute value of A plus B, plus NPOS, minus the absolute value of A, minus the absolute value of B, minus PMAXN. If E is greater than 0, then there are no roots. In that eventuality, we set the maximum excursion of the traded instrument L:Q, MAXEXC(L,Q), and the minimum excursion of the traded instrument L:Q, MINEXC(L, Q), to be equal to 0. If E is less than or equal to 0, the maximum root is the maximum of minus A and B, minus E/2; and the minimum root is the minimum of minus A and B, plus E/2. Now we are ready to go to step 303.

At step 303, the maximum excursion of the traded instrument L:Q is set equal to the minimum of the previous version of the maximum excursion of the traded instrument L:Q and the maximum root multiplied by "fixed rate N:L", which converts it to the lot instrument. Similarly, the minimum excursion of the traded instrument L:Q is set equal to the maximum of the previous version of the minimum excursion of the traded instrument L:Q and the minimum root multiplied by the same conversion factor, "fixed rate N:L". The method terminates at step 304.

Figure 31:
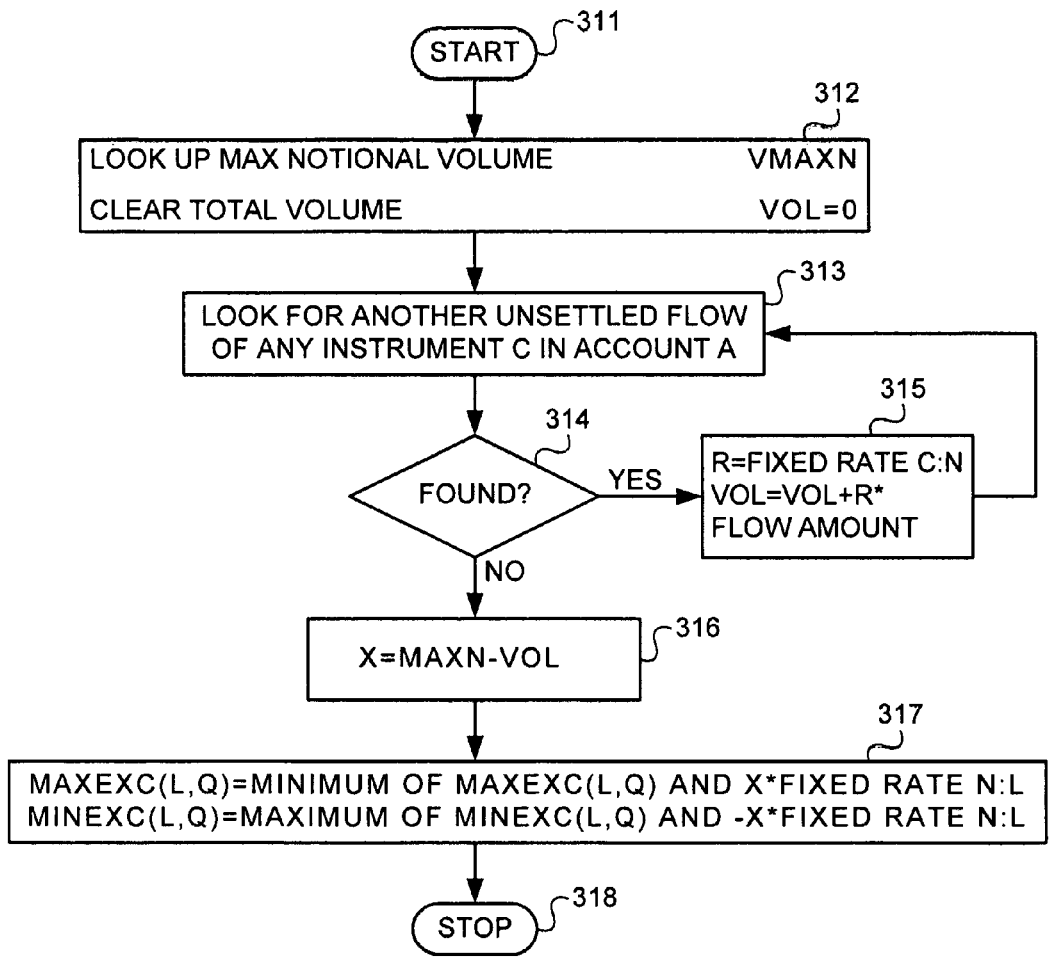
FIG. 31 is a flow diagram illustrating computation of a notional volume limit.

FIG. 31 illustrates how computer 1 calculates the notional volume limit, i.e., how computer 1 performs step 214 of FIG. 25. The method starts at step 311. At step 312, computer 1 retrieves the specified input maximum notional volume credit limit, VMAXN. This is a limit across all instruments in the account. At step 312, the total volume, VOL, is also zeroed out. At step 313, computer 1 looks for another unsettled flow of any instrument C in account A. Again, "another" is arbitrary. At step 314, it is asked whether such another unsettled flow has been found. If "yes", step 315 is executed; if "no", step 316 is executed.

Let R be the conversion factor "fixed rate C:N", where C is the instrument that we are looping through currently. Then, step 315 sets VOL to be the previous VOL plus the quantity R times the flow amount. Step 313 is then entered into. At step 316, X is set equal to VMAXN minus VOL. Again, X is the limit from just this flowchart. At step 317, the maximum excursion of the traded instrument L:Q is set equal to the minimum of the previous value of the maximum excursion of the traded instrument L:Q and X times "fixed rate N:L", i.e., we are converting from the notional instrument to the lot instrument. Similarly, the minimum excursion of the traded instrument L:Q is set equal to the maximum of the previous version of the minimum excursion of the traded instrument L:Q and minus X times the same conversion factor. The method ends at step 318.

Figure 32:
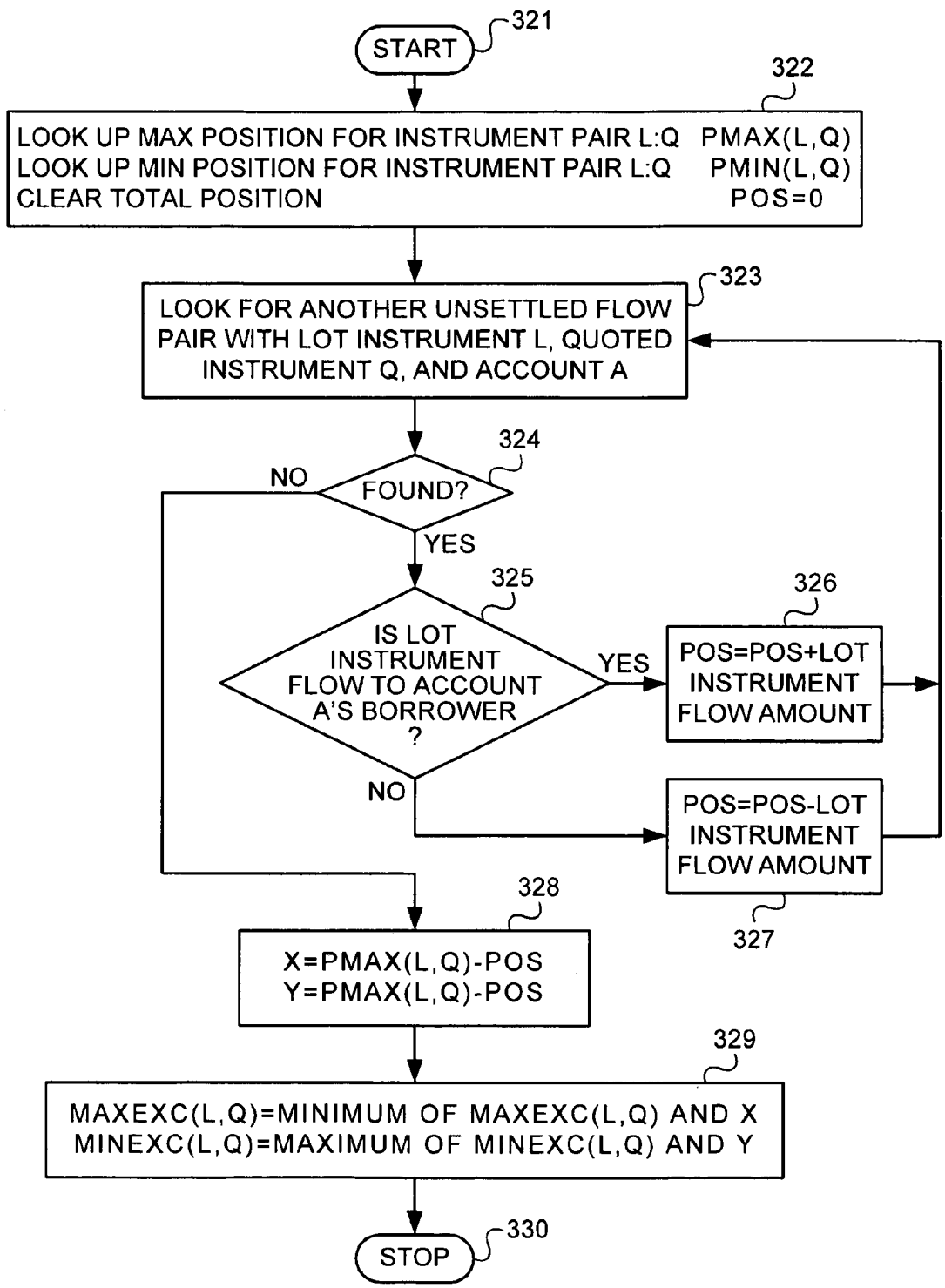
FIG. 32 is a flow diagram illustrating computation of a traded instrument L:Q position limit.

FIG. 32 illustrates how computer 1 calculates an instrument position limit, i.e., how computer 1 performs step 216 of FIG. 25. This type of position limit differs from the previous position limit flowcharts (FIGS. 26 and 27) in that the guaranteeing agent 5 is specifying that another agent 2 cannot trade any more than j L for Q, rather than the other agent 2 can trade no more than jL or jQ. This type of input credit limit is not as common as the ones described in FIGS. 26 and 27. If no agent 2 has specified this type of input credit limit, this flowchart 33 does not have to be executed. (Similarly, if no agent 2 has specified a certain other type of input credit limit, the flowchart corresponding to that credit limit does not have to be executed.) Both the L and the Q have to match in order for this flowchart 33 to be executed, unlike the flowcharts described in FIGS. 26 and 27.

The method starts at step 321. At step 322, computer 1 looks up the specified maximum position credit limit for the traded instrument L:Q, PMAX(L,Q), and the specified minimum position credit limit for the traded instrument L:Q, PMIN(L,Q). In step 322, the total position, POS, is also zeroed out. In step 323, computer 1 looks for another unsettled flow pair with lot instrument L, quoted instrument Q, and account A. Again, "another" is arbitrary. At step 324, it is asked whether such another unsettled flow pair has been found. If "no", control passes to step 328. If "yes", control passes to step 325, where it is asked whether the lot instrument flows to account A's borrower 2. In other words, the calculation is done in terms of the lot instrument to begin with, so that we do not have to convert to the lot instrument at the end of the calculation. If the answer to this question is "yes", step 326 is executed, where POS is incremented with the lot instrument flow amount. Control then passes to step 323. If the answer to the question posed in step 325 is "no", step 327 is executed, where POS is decremented by the lot instrument flow amount. Again, control then passes to step 323. At step 328, X is set equal to PMAX(L,Q) minus POS, and Y is set equal to PMIN(L,Q) minus POS. At step 329, the maximum excursion of the traded instrument L:Q is set equal to the minimum of the previous version of the maximum excursion of the traded instrument L:Q and X; and the minimum excursion of the traded instrument L:Q is set equal to the maximum of the previous value of the minimum excursion of the traded instrument L:Q and Y. The method ends at step 330.

Figure 33:
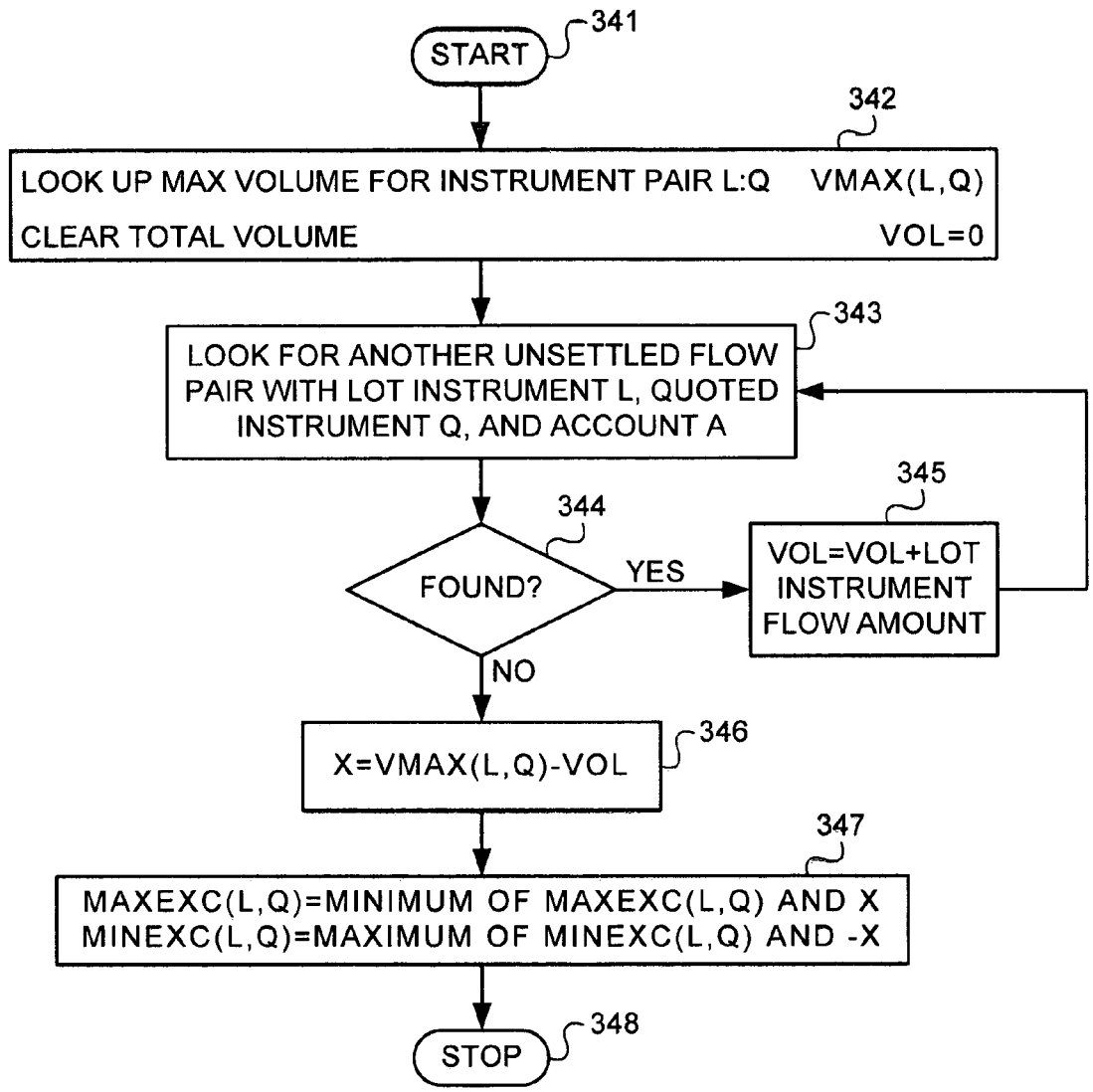
FIG. 33 is a flow diagram illustrating computation of a traded instrument L:Q volume limit.

FIG. 33 illustrates how computer 1 calculates a traded instrument volume limit, i.e., how computer 1 performs step 218 of FIG. 25. This method is similar to the method described in FIGS. 28 and 29, except the limit is on the volume traded of L for Q, not a limit on the volume of L or Q individually. The method starts at step 341. In step 342, computer 1 retrieves the specified maximum volume input credit limit for the traded instrument L:Q, VMAX(L,Q). Also in step 342, the total volume VOL is zeroed out. In step 343, computer 1 looks for another unsettled flow pair with lot instrument L, quoted instrument Q, and account A. Again, "another" is arbitrary.

At step 344, it is asked whether such another unsettled flow pair has been found. If "no", control passes to step 346. If "yes", control passes to step 345, where VOL is augmented by the lot instrument flow amount. The calculation is done in the lot instrument, so that we do not have to convert to the lot instrument at the end; and it makes the calculation more stable, because we don't have to worry about fluctuating rates. Control is then passed to step 343. At step 346, X is set equal to VMAX(L,Q) minus VOL. At step 347, the maximum excursion of the traded instrument L:Q is set equal to the minimum of the previous version of the maximum excursion of the traded instrument L:Q and X. Similarly, the minimum excursion of the traded instrument L:Q is set equal to the maximum of the previous value of the minimum excursion of the traded instrument L:Q and minus X. The method stops at step 348.

Figure 34:
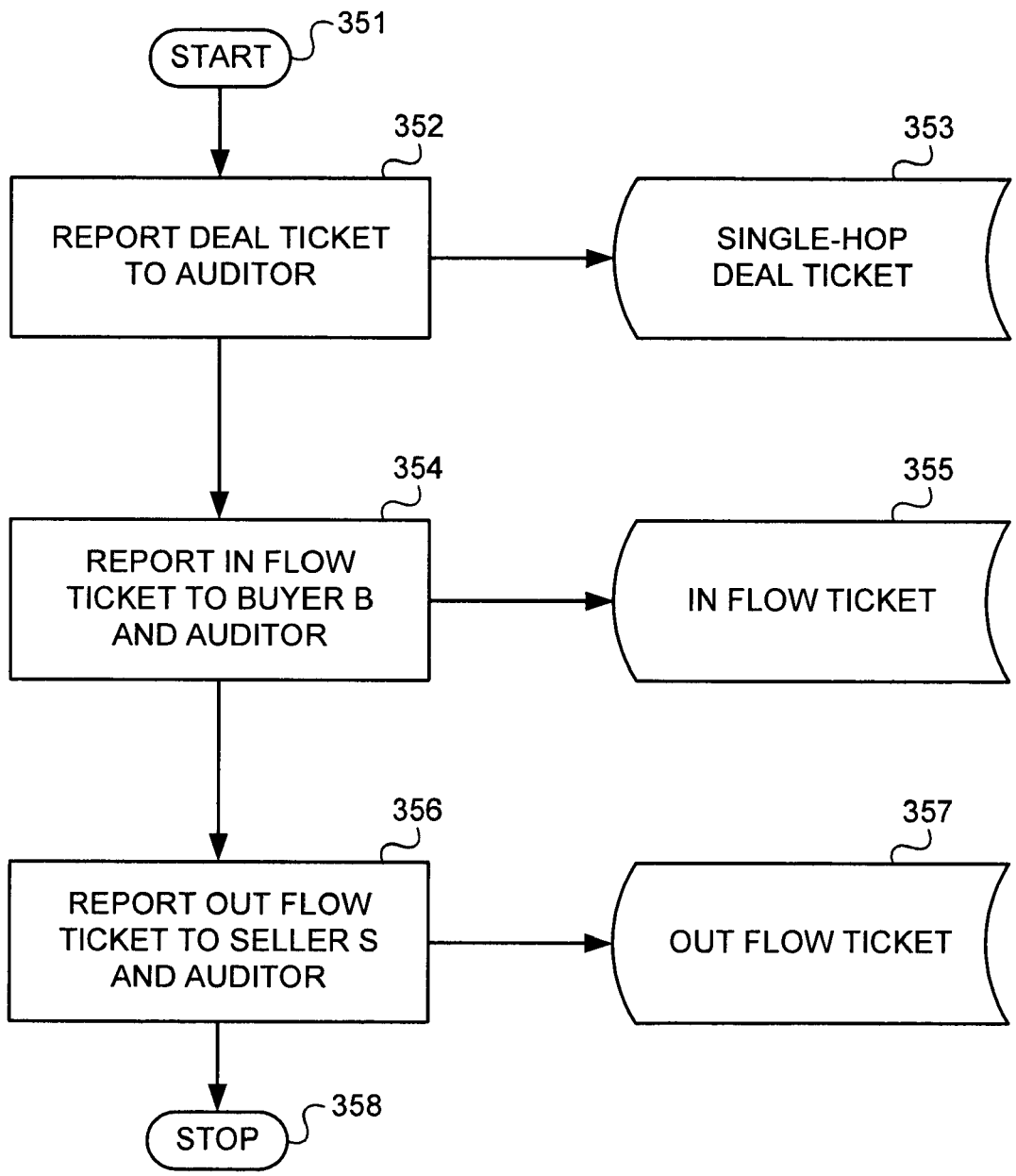
FIG. 34 is a flow diagram illustrating reporting by computer 1 of a single-hop trade.

FIG. 34 illustrates the reporting by computer 1 of single-hop trades. This method is executed after a match has been made, i.e., after a bid or offer has been taken by a counterparty 2. The method of FIG. 34 can be done either in real time or in batch mode (i.e., combined with the reporting of other trades). In FIG. 34, L is the lot instrument, Q is the quoted instrument, B is the agent 2 who is buying L, S is the agent 2 who is selling L, P is the trade price, $F_L$ is the amount of L bought and sold, $F_Q$ is P times $F_L$, i.e., the counter-amount in terms of instrument Q, and T is the settlement date and time.

The method starts at step 351. At step 352, central computer 1 issues an electronic deal ticket 353 to an auditor. The auditor is a trusted third party, e.g., an accounting firm. Ticket 353 has a plaintext portion and an encrypted portion. The plaintext gives the ticket ID, and the time and date that the ticket 353 is generated. The encrypted portion states that agent B bought $F_L$ for $F_Q$ from agent S for settlement at T. Deal ticket 353 is digitally signed by central computer 1 for authentication purposes, and encrypted by central computer 1 in a way that the auditor can decrypt the message but central computer 1 cannot decrypt the message. This is done for reasons of privacy, and can be accomplished by computer 1 encrypting the message using the public key of the auditor in a scheme using public key cryptography.

At step 354, computer 1 issues an "in" flow ticket 355 to buyer B and to the auditor. Flow ticket 355 contains a plaintext portion and an encrypted portion. The plaintext gives the ticket ID, the time and date the ticket 355 is generated, and the name of agent B. The encrypted portion states that you, agent B, bought $F_L$ for $F_Q$ from counterparty S for settlement at T. Ticket 355 is digitally signed by computer 1 and encrypted in such a way that it may be decrypted only by agent B and by the auditor, not by computer 1. Two different encryptions are done, one for agent B and one for the auditor.

At step 356, computer 1 issues an "out" flow ticket 357 to seller S and to the auditor. Out flow ticket 357 contains a plaintext portion and an encrypted portion. The plaintext gives the ticket ID, the time and date of issuance, and the name of agent S. The encrypted portion states that you, agent S, sold $F_L$ for $F_Q$ to counterparty B for settlement at T. Ticket 357 is digitally signed by computer 1 and encrypted only to agent S and to the auditor, not to computer 1. Two different encryptions are used, one to agent S and one to the auditor.

Tickets 353, 355, and 357 can include the digital identity of the individual within the agent 2 whose smartcard was plugged into the agent's computer when the transaction was made. The method ends at step 358.

Figure 35:
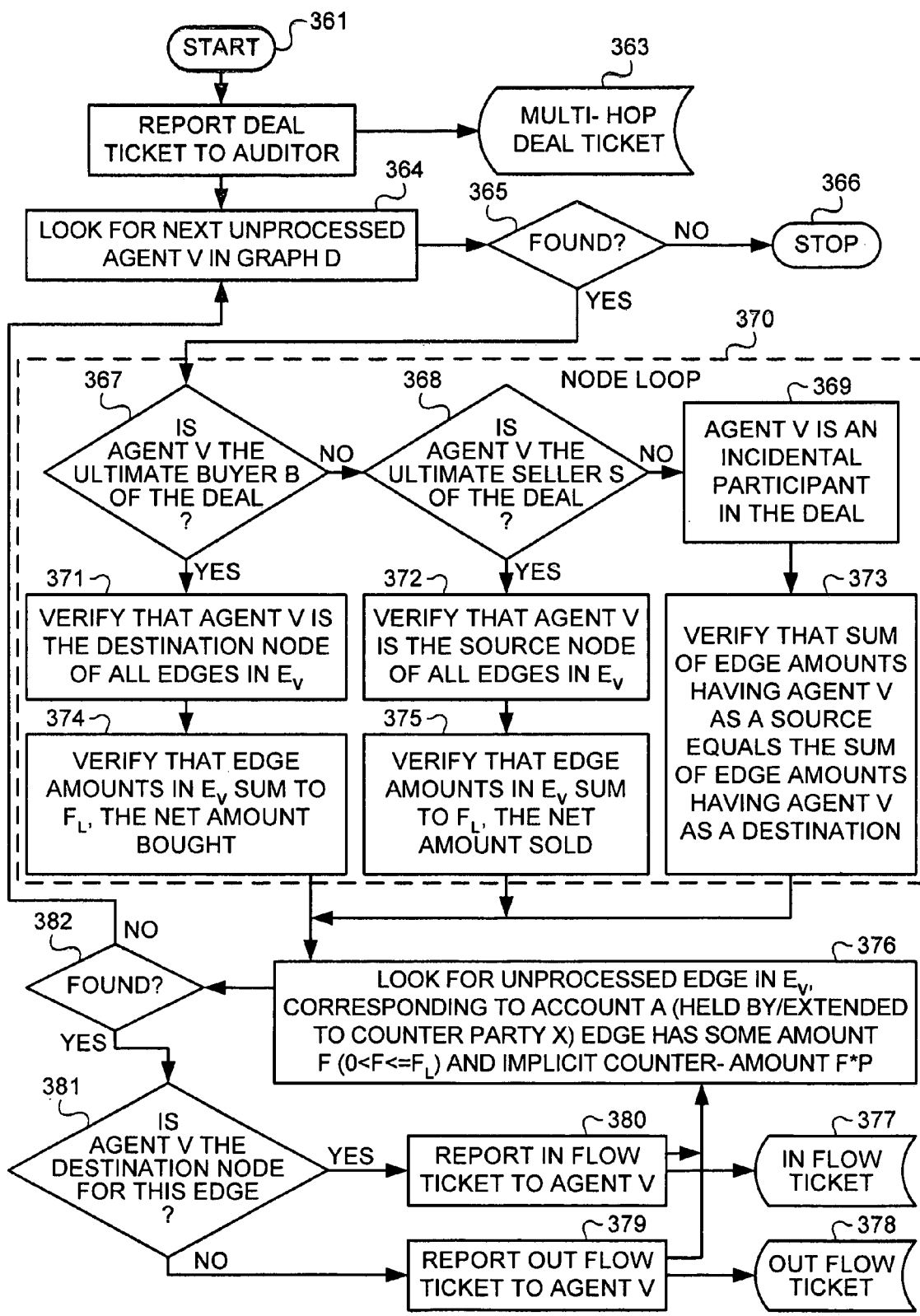
FIG. 35 is a flow diagram illustrating reporting by computer 1 of a multi-hop trade.

FIG. 35 illustrates how computer 1 electronically reports a multi-hop deal. This method is performed after the match has been made and can be done either in real time or in batch mode. Agents B and S do not know each other, as they know the identities of just their nearest neighboring agents 2. The notation for this flowchart is identical to that for FIG. 35, except that B is the ultimate buyer of L and S is the ultimate seller of L.

The method begins at step 361. At step 362, computer 1 issues deal ticket 363 to the auditor. Ticket 363 contains a plaintext portion and an encrypted portion. Ticket 363 is digitally signed by computer 1 and encrypted only to the auditor. The encrypted portion states that agent B bought $F_L$ for $F_Q$ from agent S for settlement at T, and that the deal was fulfilled by multiple direct trades in D, the directed deal fulfillment graph, i.e., the type of graph that is illustrated in FIG. 10. In other words, the auditor knows every agent 2 in the chain.

At step 364, computer 1 looks for the next unprocessed agent V in graph D. Again, "next" is arbitrary. At step 365, it is asked whether such an unprocessed agent V has been found. If not, the method stops at step 366. If the answer is "yes", node loop 370 is entered into. For agent V, this node loop examines the set $E_V$ of directed edges 3 in D which have agent V as either a source or destination. Each edge 3 has an amount F that is greater than zero and less than or equal to $F_L$. Note that this verification process is for illustration only; there would not be a match if these constraints were not satisfied. At step 367, it is asked whether agent V is the ultimate buyer B of the deal. If "no", control is passed to step 368. If "yes", control is passed to step 371.

At step 368, it is asked whether agent V is the ultimate seller S of the deal. If "no", control is passed to step 369. If "yes", control is passed to step 372. At step 369, computer 1 concludes that agent V is an incidental participant in the deal, i.e., a middleman 5. Control is then passed to step 373, which verifies that the sum of the edge 3 amounts having agent V as a source equals the sum of the edge amounts 3 having agent V as a destination. Sums are used because that agent 5 could have several edges 3 in and out. Therefore, it is known that agent V has no net market position change. Control is then passed to step 376. At step 372, it is verified that agent V is the source node 2 (as opposed to the destination node) of all edges 3 in $E_V$. In step 375, it is verified that edge 3 amounts in $E_V$ sum to $F_L$, the net amount sold. Control is then passed to step 376.

In step 371, it is verified that agent V is the destination node 2 (as opposed to the source node) of all edges 3 in $E_V$. At step 374, it is verified that edge 3 amounts in $E_V$ sum to $F_L$, the net amount bought. Control is then passed to step 376, where computer 1 looks for the next unprocessed edge in $E_V$ corresponding to account A. Steps 376–382 constitute an edge loop. Account A is any account held by or extended to counterparty X. Counterparty X is the counterparty 2 to agent V for that edge 3. The edge 3 has to have some amount F, where F is greater than 0 and less than or equal to $F_L$, and an implicit counter-amount F times P; otherwise, there would be no way to clear the trade. Again, "next" in step 376 is arbitrary. Control is then passed to step 382.

At step 382, it is asked whether such a next unprocessed edge 3 has been found. If not, control is passed to step 364. If "yes", control is passed to step 381, where it is asked whether agent V is the destination node 2 for this edge 3. If "yes", then step 380 is executed. If "no", then by definition, agent V is the source node 2 for this edge 3, and step 379 is executed. Control is passed to step 376 after either of step 379 or 380 is executed.

At step 380, computer 1 reports an "in" flow ticket 377 to agent V, because the lot currency is flowing in to agent V. Flow ticket 377 contains a plaintext portion and an encrypted portion. The plaintext includes the ticket ID, the time and date of issuance, and the name of agent V. The encrypted portion states that you, agent V, bought F of L for F times P of Q from counterparty X for settlement at T. In this case, counterparty X is just the immediate neighbor 2 to agent V, preserving anonymity. Ticket 377 is digitally signed by computer 1 and encrypted by computer 1 only to agent V and to the auditor, not to computer 1. Two encryptions are performed, one to agent V and one to the auditor.

At step 379, computer 1 generates an "out" flow ticket 378 to agent V. Ticket 378 contains a plaintext portion and an encrypted portion. The plaintext includes the ticket ID, the time and date of issuance, and the name of agent V. The encrypted portion states that you, agent V, sold F of L for F times P of Q to counterparty X for settlement at T. Again, counterparty X is just the immediate neighbor 2 to agent V, preserving anonymity. Flow ticket 378 is digitally signed by computer 1 and encrypted by computer 1 only to agent V and to the auditor, not to computer 1. Two encryptions are performed, one to agent V and one to the auditor.

Tickets 363, 377, and 378 can include the digital identity of the individual within agent 2 whose smartcard was plugged into the agent's terminal when the transaction was made.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A trading apparatus comprising a non-disjointed network of j credit-extending agents and k non-credit-extending agents, where j and k are each positive integers at least equal to two; wherein
   means for agents connected via trading channels; and
   the agents trade items from the group of items consisting of commodities and financial instruments; said apparatus further comprising:
   a central computer coupled to the agents, said computer calculating, for each pair of items being traded, topology-dependent individual trading limits for each agent and conveying to each agent individualized current tradable bid and offered prices and sizes to a depth, said prices, sizes, and depth automatically determined by and taking into account all of the current trading limits between all pairs of agents.

2. A non-disjointed network apparatus comprising:
   means for j credit-extending agents and k non-credit-extending agents, where j and k are each positive integers at least equal to two;
   means for a plurality of trading channels coupling the agents to each other, wherein the trading channels permit the agents to trade items from the group of items consisting of commodities and financial instruments; and
   a central computer which, for each pair of items being traded, converts the network apparatus into a virtually cliqued network in which every agent has a capability to trade with every other agent, at least indirectly, said central computer conveying to each agent individualized current tradable bid and offered prices and sizes to a depth, said prices, sizes, and depth automatically determined by and taking into account all of the current trading limits between all pairs of agents.

3. The apparatus of claim 1 wherein, after each trade, the central computer re-computes the trading limits, thereby changing the topology of the network.

4. The apparatus of claim 3 wherein changing the trading limits for a given pair of items forces a change in the trading limits for at least one other pair of items.

5. The apparatus of claim 1 wherein the central computer comprises an application programming interface enabling any agent to connect thereto.

6. The apparatus of claim 1 wherein each agent comprises means for displaying:
   said agent's current position in each item traded; and
   said agent's currently available trading limits, for all item pairs, with its immediate neighboring agents.

7. The apparatus of claim 1 wherein, for each agent, the individualized current tradable bid and offered prices and sizes constitute a custom limit order book taking into account multi-hop trading limits, wherein the multi-hop trading limits take into account credit extended by credit bridges between agents.

8. The apparatus of claim 1 wherein the central computer removes trading channels in instances where a credit-extending agent has not authorized acting as an intermediary for back-to-back trades.

9. The apparatus of claim 1 wherein the trading limits are derived from at least one specified input credit limit from the group of specified input credit limits comprising position limits for lot items, position limits for quoted items, volume limits for lot items, volume limits for quoted items, notional position limits, notional volume limits, item pair position limits, and item pair volume limits.

10. The apparatus of claim 9 wherein the central computer converts the specified input credit limits into trading limits for each pair of items being traded, and places said trading limits into custom limit order books for each agent, said custom limit order books taking into account multi-hop trades, wherein the multi-hop trades take into account credit extended by credit bridges between agents.

11. The apparatus of claim 1 wherein the trading limits take into account an input lot item position credit limit specified by a credit-extending agent.

12. The apparatus of claim 1 wherein the trading limits take into account an input quoted item position credit limit specified by a credit-extending agent.

13. The apparatus of claim 1 wherein the trading limits take into account an input volume credit limit for a lot item specified by a credit-extending agent.

14. The apparatus of claim 1 wherein the trading limits take into account an input volume credit limit for a quoted item specified by a credit-extending agent.

15. The apparatus of claim 1 wherein the trading limits take into account an input notional position credit limit specified by a credit-extending agent.

16. The apparatus of claim 1 wherein the trading limits take into account an input notional volume credit limit specified by a credit-extending agent.

17. The apparatus of claim 1 wherein the trading limits take into account an input traded item position credit limit specified by a credit-extending agent.

18. The apparatus of claim 1 wherein the trading limits take into account an input traded item volume credit limit specified by a credit-extending agent.

19. The apparatus of claim 1 wherein, after each trade between a buying agent and a selling agent, the central computer issues a deal ticket to an auditor, an in flow ticket to the buying agent, and an out flow ticket to the selling agent.

20. The apparatus of claim 19 wherein:
   the trade is a multi-hop trade taking into account credit extended by credit bridges between agents;
   there is at least one intermediate agent situated in the flow between the buying agent and the selling agent;
   the buying agent and the selling agent are unknown to each other;
   the deal ticket contains the identity of each intermediate agent;

the in flow ticket contains the identity of just an immediate neighboring agent; and the out flow ticket contains the identity of just an immediate neighboring agent.

21. The apparatus of claim 19 wherein each ticket is digitally signed by the central computer.

22. The apparatus of claim 19 wherein each ticket is encrypted by the central computer.

23. The apparatus of claim 22 wherein the in flow ticket is encrypted to the buying agent and to the auditor, but not to the central computer.

24. The apparatus of claim 22 wherein the out flow ticked is encrypted to the selling agent and to the auditor, but not to the central computer.

* * * * *